United States Patent
Huang et al.

(10) Patent No.: US 12,021,585 B2
(45) Date of Patent: **\*Jun. 25, 2024**

(54) COEFFICIENT DETERMINATION FOR MEASUREMENT REPORT FEEDBACK IN MULTI-LAYER BEAMFORMED COMMUNICATIONS

(71) Applicant: QUALCOMM Incorporated, San Diego, CA (US)

(72) Inventors: Min Huang, Beijing (CN); Chao Wei, Beijing (CN); Chenxi Hao, Beijing (CN); Liangming Wu, Beijing (CN); Qiaoyu Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,617

(22) Filed: Nov. 21, 2022

(65) Prior Publication Data

US 2023/0131745 A1    Apr. 27, 2023

Related U.S. Application Data

(63) Continuation of application No. 17/312,074, filed as application No. PCT/US2019/126869 on Dec. 20, 2019, now Pat. No. 11,509,367.

(30) Foreign Application Priority Data

Dec. 24, 2018 (WO) ................ PCT/CN2018/123041

(51) Int. Cl.
*H04L 23/02*    (2006.01)
*H04B 7/0456*   (2017.01)
*H04B 7/06*     (2006.01)

(52) U.S. Cl.
CPC ............ *H04B 7/0478* (2013.01); *H04B 7/061* (2013.01); *H04B 7/0623* (2013.01); *H04B 7/0695* (2013.01)

(58) Field of Classification Search
CPC ... H04L 1/0054; H04L 1/005; H04L 25/0224; H04B 7/0478; H04B 7/0626; H04B 7/0636

(Continued)

(56) References Cited

U.S. PATENT DOCUMENTS

| 11,509,367 B2 | 11/2022 | Huang et al. | |
| 2016/0037550 A1* | 2/2016 | Barabell | H04B 17/318 455/450 |

(Continued)

FOREIGN PATENT DOCUMENTS

| CN | 106797241 A | 5/2017 |
| CN | 106961296 A | 7/2017 |

(Continued)

OTHER PUBLICATIONS

AT&T, et al., "Evaluation of Beam Correspondence as Mandatory UE Feature", 3GPP TSG RAN Meeting #82, RP-182755, Dec. 13, 2018, 9 pages.

(Continued)

*Primary Examiner* — Khai Tran
(74) *Attorney, Agent, or Firm* — Holland & Hart LLP

(57) ABSTRACT

Methods, systems, and devices for wireless communications are described that provide for channel state information (CSI) feedback for multiple discrete Fourier transform (DFT) beams on multiple transmission layers. A user equipment (UE) may report a total number of non-zero power DFT beams across all of the transmission layers. The UE may be configured with a total number of leading beams ($K_{total}$) across all of the transmission layers for which to (Continued)

provide high quantization feedback. When the total number of non-zero DFT beams across all the transmission layers exceeds the configured total number of leading beams across all the transmission layers, the UE may report high-resolution quantization feedback for $K_{total}$ non-zero power precoding coefficients having the highest amplitude coefficients, and may report low-resolution quantization feedback for the remaining non-zero power precoding coefficients. A base station may receive the CSI feedback to determine a precoding matrix.

35 Claims, 23 Drawing Sheets

(58) Field of Classification Search
USPC .................................... 375/262, 260, 267
See application file for complete search history.

(56) References Cited

U.S. PATENT DOCUMENTS

| | | | |
|---|---|---|---|
| 2017/0302353 A1* | 10/2017 | Rahman | H04B 7/0469 |
| 2018/0048369 A1* | 2/2018 | Carvalho | H04B 1/0483 |
| 2018/0145737 A1 | 5/2018 | Rahman et al. | |
| 2018/0254813 A1 | 9/2018 | Gao et al. | |
| 2018/0367197 A1 | 12/2018 | Yang et al. | |
| 2019/0089442 A1 | 3/2019 | Akoum et al. | |
| 2019/0320454 A1 | 10/2019 | Li et al. | |
| 2021/0111775 A1 | 4/2021 | Abdelghaffar et al. | |
| 2022/0006500 A1 | 1/2022 | Wei | |

FOREIGN PATENT DOCUMENTS

| | | |
|---|---|---|
| WO | WO-2017190356 | 11/2017 |
| WO | WO-2018029644 A2 | 2/2018 |
| WO | WO-2018190651 A1 | 10/2018 |

OTHER PUBLICATIONS

International Search Report and Written Opinion—PCT/CN2018/123041—ISA/EPO—dated Jul. 25, 2019.
International Search Report and Written Opinion—PCT/CN2019/126869—ISA/EPO—dated Mar. 27, 2020.
Qualcomm Incorporated: "CSI Enhancement for MU-MIMO Support", 3GPP TSG RAN WG1 Meeting #94bis, R1-1811276, 3GPP, Mobile Competence Centre, 650, Route Des Lucioles, F-06921 Sophia-Antipolis Cedex, France, Oct. 8, 2018-Oct. 12, 2018, pp. 1-6, Sep. 29, 2018, XP051518679, Retrieved from the Internet: URL: http://www.3gpp.org/ftp/tsg%5Fran/WG1%5FRL1/TSGR1%5F94b/Docs/R1%2D1811276%2Ezip.
Samsung: "CSI Enhancement for MU-MIMO", 3GPP TSG RAN WG1 Meeting #95, R1-1813001, 3rd Generation Partnership Project, Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018, 5 Pages, XP051554980, Section 3, pp. 3-4.
Samsung: "Outcome of Offline Session for CSI Enhancement for MU-MIMO Support", 3GPP TSG RAN WG1 Meeting #95, R1-1814201, 3rd Generation Partnership Project, Mobile Competence Centre, 650, Route Des Lucioles, F-06921 Sophia-Antipolis Cedex, France, vol. RAN WG1, Nov. 12, 2018-Nov. 16, 2018, Nov. 19, 2018, 3 Pages, XP051494658, part 2.2, section 2.2.
Samsung: "Summary of CSI Enhancement for MU-MIMO Support", 3GPP TSG RAN WG1 Meeting #95, R1-1813002, 3rd Generation Partnership Project, Mobile Competence Centre, 650, Route Des Lucioles, F-06921 Sophia-Antipolis Cedex, France, vol. RAN WG1, Nov. 12, 2018-Nov. 16, 2018, Nov. 15, 2018, 9 Pages, XP051494308, Section 2.1.
Supplementary European Search Report—EP19901625—Search Authority—Munich—dated Aug. 8, 2022.

* cited by examiner $$[\text{Precoding Matrix } \underline{305}] = [\text{Spatial Domain Compression Matrix } \underline{310}] \times [\text{Coefficient Matrix } \underline{315}]$$

[ Precoding Matrix 405 ] = [ Spatial Domain Compression Matrix 410 ] × [ 4×4 matrix of circles ] 415

COEFFICIENT DETERMINATION FOR MEASUREMENT REPORT FEEDBACK IN MULTI-LAYER BEAMFORMED COMMUNICATIONS

CROSS REFERENCE

The present Application for Patent is a Continuation of U.S. 371 National Phase application Ser. No. 17/312,074 by Huang et al., entitled "COEFFICIENT DETERMINATION FOR MEASUREMENT REPORT FEEDBACK IN MULTI-LAYER BEAMFORMED COMMUNICATIONS" filed Jun. 9, 2021, which claims priority to International Patent Application No. PCT/CN2019/126869 by Huang et al., entitled "COEFFICIENT DETERMINATION FOR MEASUREMENT REPORT FEEDBACK IN MULTI-LAYER BEAMFORMED COMMUNICATIONS," filed Dec. 20, 2019, and to International Patent Application No. PCT/CN2018/123041 by Huang, et al., entitled "COEFFICIENT DETERMINATION FOR MEASUREMENT REPORT FEEDBACK IN MULTI-LAYER BEAMFORMED COMMUNICATIONS" filed Dec. 24, 2018, each of which are assigned to the assignee hereof, and each of which is hereby incorporated by reference in its entirety.

BACKGROUND

The following relates generally to wireless communications, and more specifically to coefficient determination for measurement report feedback in multi-layer beamformed communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications system, wireless devices may implement a precoder (e.g., a precoding matrix) for improving multiple input-multiple output (MIMO) communication performance based on a high resolution, linear combination codebook. For example, a base station may select the precoder from the codebook based on a linear combination of discrete Fourier transform (DFT) beams. However, for the base station to select the precoder for communicating with a UE, the base station may require a precoding matrix indicator (PMI) from the UE, where the PMI indicates beam combination coefficient information. The feedback overhead for such a PMI report may be large in order for the UE to report a beam combination coefficient for each beam per sub-band. In some cases, feedback overhead may be reduced by reporting a number of leading beams per transmission layer with high quantization (e.g. with four-bits for both amplitude and phase quantization) and reporting a number of non-leading beams with low quantization (e.g., two bits for amplitude and phase). In such cases, as more transmission layers are reported, more leading beams having high quantization may be reported, which can increase feedback overhead. Further, in some cases, a set number of leading beams per layer may be reported, which may result in high importance beams being under-quantized on some layers. Such relatively high feedback overhead and under-quantization of relatively high importance beams may result in an inefficient use of channel resources.

SUMMARY

The described techniques relate to improved methods, systems, devices, and apparatuses that support coefficient determination for measurement report feedback in multi-layer beamformed communications. Various aspects of the disclosure provide techniques for providing channel state information (CSI) feedback for multiple discrete Fourier transform (DFT) beams on multiple transmission layers. In some cases, a user equipment (UE) may report a total number of non-zero power beams across all of the transmission layers. In some cases, the UE may be configured with a total number of leading beams ($K_{total}$) across all of the transmission layers for which to provide high quantization feedback. In such cases, when the total number of non-zero beams across all the transmission layers exceeds the configured total number of leading beams, the UE may report high-resolution quantization feedback for $K_{total}$ non-zero power precoding coefficients having the highest amplitude, and may report low-resolution quantization feedback for the remaining non-zero power precoding coefficients. A base station may receive the CSI feedback and use the reported precoding coefficients to determine a precoding matrix for use in a precoding process.

A method of wireless communication at a UE is described. The method may include performing CSI measurements on one or more reference signal transmissions from a base station, determining, based on the CSI measurements, a set of complex coefficients for weighting and co-phasing for a linear combination of a set of discrete Fourier transform (DFT) beams of a set of transmission layers of the base station, where a first set of the set of DFT beams each have a complex coefficient of zero and a second set of the set of DFT beams each have a non-zero complex coefficient, determining a total number of leading beams jointly across the set of transmission layers and corresponding non-zero complex coefficients of the second set of the set of DFT beams, where the total number of leading beams is equal to a minimum value between the determined total number of DFT beams having non-zero complex coefficient across all the transmission layers and a configured maximum number of leading beams across all the transmission layers, quantizing the set of complex coefficients of the second set of the set of DFT beams based on the total number of leading beams, and transmitting a measurement report to the base station, where the measurement report includes at least an indication of the total number of the non-zero complex coefficients and the quantized non-zero complex coefficients for linear combinations of the set of DFT beams.

An apparatus for wireless communication at a UE is described. The apparatus may include a processor, memory in electronic communication with the processor, and instructions stored in the memory. The instructions may be executable by the processor to cause the apparatus to perform CSI measurements on one or more reference signal transmissions from a base station, determine, based on the CSI measurements, a set of complex coefficients for weighting and co-phasing for a linear combination of a set of discrete Fourier transform (DFT) beams of a set of transmission layers of the base station, where a first set of the set of DFT beams each have a complex coefficient of zero and a second set of the set of DFT beams each have a non-zero complex coefficient, determine a total number of leading beams jointly across the set of transmission layers and corresponding non-zero complex coefficients of the second set of the set of DFT beams, where the total number of leading beams is equal to a minimum value between the determined total number of DFT beams having non-zero complex coefficient across all the transmission layers and a configured maximum number of leading beams across all the transmission layers, quantize the set of complex coefficients of the second set of the set of DFT beams based on the total number of leading beams, and transmit a measurement report to the base station, where the measurement report includes at least an indication of the total number of the non-zero complex coefficients and the quantized non-zero complex coefficients for linear combinations of the set of DFT beams.

Another apparatus for wireless communication at a UE is described. The apparatus may include means for performing CSI measurements on one or more reference signal transmissions from a base station, determining, based on the CSI measurements, a set of complex coefficients for weighting and co-phasing for a linear combination of a set of discrete Fourier transform (DFT) beams of a set of transmission layers of the base station, where a first set of the set of DFT beams each have a complex coefficient of zero and a second set of the set of DFT beams each have a non-zero complex coefficient, determining a total number of leading beams jointly across the set of transmission layers and corresponding non-zero complex coefficients of the second set of the set of DFT beams, where the total number of leading beams is equal to a minimum value between the determined total number of DFT beams having non-zero complex coefficient across all the transmission layers and a configured maximum number of leading beams across all the transmission layers, quantizing the set of complex coefficients of the second set of the set of DFT beams based on the total number of leading beams, and transmitting a measurement report to the base station, where the measurement report includes at least an indication of the total number of the non-zero complex coefficients and the quantized non-zero complex coefficients for linear combinations of the set of DFT beams.

A non-transitory computer-readable medium storing code for wireless communication at a UE is described. The code may include instructions executable by a processor to perform CSI measurements on one or more reference signal transmissions from a base station, determine, based on the CSI measurements, a set of complex coefficients for weighting and co-phasing for a linear combination of a set of discrete Fourier transform (DFT) beams of a set of transmission layers of the base station, where a first set of the set of DFT beams each have a complex coefficient of zero and a second set of the set of DFT beams each have a non-zero complex coefficient, determine a total number of leading beams jointly across the set of transmission layers and corresponding non-zero complex coefficients of the second set of the set of DFT beams, where the total number of leading beams is equal to a minimum value between the determined total number of DFT beams having non-zero complex coefficient across all the transmission layers and a configured maximum number of leading beams across all the transmission layers, quantize the set of complex coefficients of the second set of the set of DFT beams based on the total number of leading beams, and transmit a measurement report to the base station, where the measurement report includes at least an indication of the total number of the non-zero complex coefficients and the quantized non-zero complex coefficients for linear combinations of the set of DFT beams.

In some examples of the method, apparatuses, and non-transitory computer-readable medium described herein, the determining the total number of leading beams further may include operations, features, means, or instructions for receiving, from the base station, an indication of the total number of leading beams for the set of transmission layers, and identifying a first subset of beams from the second set of DFT beams that may be leading beams based on the total number of leading beams, and a second subset of beams from the DFT beams as beams that may be outside of the first subset of beams.

In some examples of the method, apparatuses, and non-transitory computer-readable medium described herein, a high-resolution quantized subband coefficient may be provided for each leading beam of the first subset of beams, and where a low-resolution quantized subband coefficient may be provided for each beam of the second subset of beams. Some examples of the method, apparatuses, and non-transitory computer-readable medium described herein may further include operations, features, means, or instructions for determining a number of leading beams for each transmission layer based on a wideband amplitude coefficient of each DFT beam associated with each transmission layer. Some examples of the method, apparatuses, and non-transitory computer-readable medium described herein may further include operations, features, means, or instructions for leading beams for all of the transmission layers may be jointly determined based on wideband amplitude coefficients associated with each DFT beam, and where different transmission layers may be capable of having different numbers of leading beams.

In some examples of the method, apparatuses, and non-transitory computer-readable medium described herein, the wideband amplitude coefficient of each DFT beam may be an unadjusted wideband amplitude coefficient associated with each DFT beam, and where all of the DFT beams of all of the transmission layers may be sorted in descending order according to the unadjusted wideband amplitude of each DFT beam, and DFT beams with the largest unadjusted wideband amplitudes may be selected as the number of leading beams.

In some examples of the method, apparatuses, and non-transitory computer-readable medium described herein, the determining the number of leading beams may include operations, features, means, or instructions for normalizing the wideband amplitude coefficient of each DFT beam such that a sum power of normalized wideband amplitude coefficients for each layer equals one, sorting all of the DFT beams of all of the transmission layers in descending order according to the normalized wideband amplitude coefficients, and selecting DFT beams with the largest normalized wideband amplitude coefficients as the number of leading beams. In some examples of the method, apparatuses, and non-transitory computer-readable medium described herein when two DFT beams have identical normalized wideband amplitudes coefficients, a beam having a lower layer index may be selected as a leading beam ahead of a DFT beam having a higher layer index, and a DFT beam having a lower beam index may be selected as a leading beam ahead of a DFT beam having a higher beam index.

In some examples of the method, apparatuses, and non-transitory computer-readable medium described herein, each transmission layer may have a minimum number of leading beams and a maximum number of leading beams, and where the number of leading beams for each transmission layer may be further based on the minimum number of leading beams and the maximum number of leading beams. Some examples of the method, apparatuses, and non-transitory computer-readable medium described herein may further include operations, features, means, or instructions for determining a number of leading beams for each transmission layer based on an even allocation of leading beams among each of the transmission layers. In some examples of the method, apparatuses, and non-transitory computer-readable medium described herein, the number of leading beams may be configured by the base station, and where when the number of leading beams divided by a number of the set of transmission layers may be a non-integer, one or more transmission layers may be selected to may have one or more additional leading beams based on a layer index. Some examples of the method, apparatuses, and non-transitory computer-readable medium described herein may further include operations, features, means, or instructions for determining a number of leading beams for each transmission layer based on a configured mapping of the number of leading beams for each transmission layer.

Some examples of the method, apparatuses, and non-transitory computer-readable medium described herein may further include operations, features, means, or instructions for determining a number of leading beams for each transmission layer based on a first number of leading beams configured for each of one or more transmission layers having higher measured channel conditions than one or more other transmission layers, and a second number of leading beams configured for each remaining transmission layer. In some examples of the method, apparatuses, and non-transitory computer-readable medium described herein, the measurement report may be a first measurement report provided based on a number of the set of transmission layers exceeding a threshold value, and where a second measurement report may be provided based on the number of transmission layers being at or below the threshold value, and where a number of leading beams associated with the first measurement report may be different than a number of leading beams associated with the second measurement report.

A method of wireless communication at a base station is described. The method may include establishing a connection with a UE via a set of transmission layers, where each transmission layer uses two or more discrete Fourier transform (DFT) beams for communications between the UE and the base station, transmitting one or more reference signal transmissions to the UE on the set of transmission layers, and receiving a measurement report from the UE based on the one or more reference signal transmissions, the measurement report including complex coefficients for linear combinations of the set of DFT beams, where a first set of the DFT beams each have a complex coefficient of zero and a second set of the DFT beams each have a non-zero complex coefficient, and the measurement report indicates a total number of transmission beams in the second set of DFT beams.

An apparatus for wireless communication at a base station is described. The apparatus may include a processor, memory in electronic communication with the processor, and instructions stored in the memory. The instructions may be executable by the processor to cause the apparatus to establish a connection with a UE via a set of transmission layers, where each transmission layer uses two or more discrete Fourier transform (DFT) beams for communications between the UE and the base station, transmit one or more reference signal transmissions to the UE on the set of transmission layers, and receive a measurement report from the UE based on the one or more reference signal transmissions, the measurement report including complex coefficients for linear combinations of the set of DFT beams, where a first set of the DFT beams each have a complex coefficient of zero and a second set of the DFT beams each have a non-zero complex coefficient, and the measurement report indicates a total number of transmission beams in the second set of DFT beams.

Another apparatus for wireless communication at a base station is described. The apparatus may include means for establishing a connection with a UE via a set of transmission layers, where each transmission layer uses two or more discrete Fourier transform (DFT) beams for communications between the UE and the base station, transmitting one or more reference signal transmissions to the UE on the set of transmission layers, and receiving a measurement report from the UE based on the one or more reference signal transmissions, the measurement report including complex coefficients for linear combinations of the set of DFT beams, where a first set of the DFT beams each have a complex coefficient of zero and a second set of the DFT beams each have a non-zero complex coefficient, and the measurement report indicates a total number of transmission beams in the second set of DFT beams.

A non-transitory computer-readable medium storing code for wireless communication at a base station is described. The code may include instructions executable by a processor to establish a connection with a UE via a set of transmission layers, where each transmission layer uses two or more discrete Fourier transform (DFT) beams for communications between the UE and the base station, transmit one or more reference signal transmissions to the UE on the set of transmission layers, and receive a measurement report from the UE based on the one or more reference signal transmissions, the measurement report including complex coefficients for linear combinations of the set of DFT beams, where a first set of the DFT beams each have a complex coefficient of zero and a second set of the DFT beams each have a non-zero complex coefficient, and the measurement report indicates a total number of transmission beams in the second set of DFT beams.

Some examples of the method, apparatuses, and non-transitory computer-readable medium described herein may further include operations, features, means, or instructions for transmitting, to the UE, an indication of a total number of leading beams, and identifying, based on a number of DFT beams in the second set of DFT beams and the total number of leading beams, a first subset of beams from the second set of DFT beams that may be leading beams, and a second subset of beams from the second set of DFT beams as beams that may be outside of the first subset of beams. In some examples of the method, apparatuses, and non-transitory computer-readable medium described herein, the measurement report includes, for the first subset of beams, a high-resolution quantized subband coefficient for each leading beam of the first subset of beams, and where a low-resolution quantized subband coefficient may be provided for each beam of the second subset of beams.

Some examples of the method, apparatuses, and non-transitory computer-readable medium described herein may further include operations, features, means, or instructions for determining a number of leading beams for each transmission layer based on a wideband amplitude coefficient of each DFT beam associated with each transmission layer. In some examples of the method, apparatuses, and non-transitory computer-readable medium described herein leading beams for all of the transmission layers may be jointly determined based on wideband amplitude coefficients associated with each DFT beam, and where different transmission layers may be capable of having different numbers of leading beams. In some examples of the method, apparatuses, and non-transitory computer-readable medium described herein, each transmission layer may have a minimum number of leading beams and a maximum number of leading beams, and where the number of leading beams for each transmission layer may be further based on the minimum number of leading beams and the maximum number of leading beams.

Some examples of the method, apparatuses, and non-transitory computer-readable medium described herein may further include operations, features, means, or instructions for determining a number of leading beams for each transmission layer based on an even allocation of leading beams among each of the transmission layers. Some examples of the method, apparatuses, and non-transitory computer-readable medium described herein may further include operations, features, means, or instructions for configuring the number of leading beams at the UE, and where, when the number of leading beams divided by a number of the set of transmission layers may be a non-integer, one or more transmission layers may be configured to may have one or more additional leading beams based on a layer index.

Some examples of the method, apparatuses, and non-transitory computer-readable medium described herein may further include operations, features, means, or instructions for configuring the number of leading beams at each transmission layer for the UE, and transmitting a mapping of the number of leading beams at each transmission layer to the UE. Some examples of the method, apparatuses, and non-transitory computer-readable medium described herein may further include operations, features, means, or instructions for configuring different numbers of leading beams for different transmission layers based on measured channel conditions at the UE. In some examples of the method, apparatuses, and non-transitory computer-readable medium described herein, the measurement report may be a first measurement report provided based on a number of the set of transmission layers at the UE exceeding a threshold value, and where a second measurement report may be provided based on the number of transmission layers being at or below the threshold value, and where a number of leading beams associated with the first measurement report may be different than a number of leading beams associated with the second measurement report.

BRIEF DESCRIPTION OF THE DRAWINGS

FIG. 4 illustrates an example of a leading beam coefficient identification in a matrix operation that supports coefficient determination for measurement report feedback in multi-layer beamformed communications in accordance with aspects of the present disclosure.

DETAILED DESCRIPTION

Figure 1:
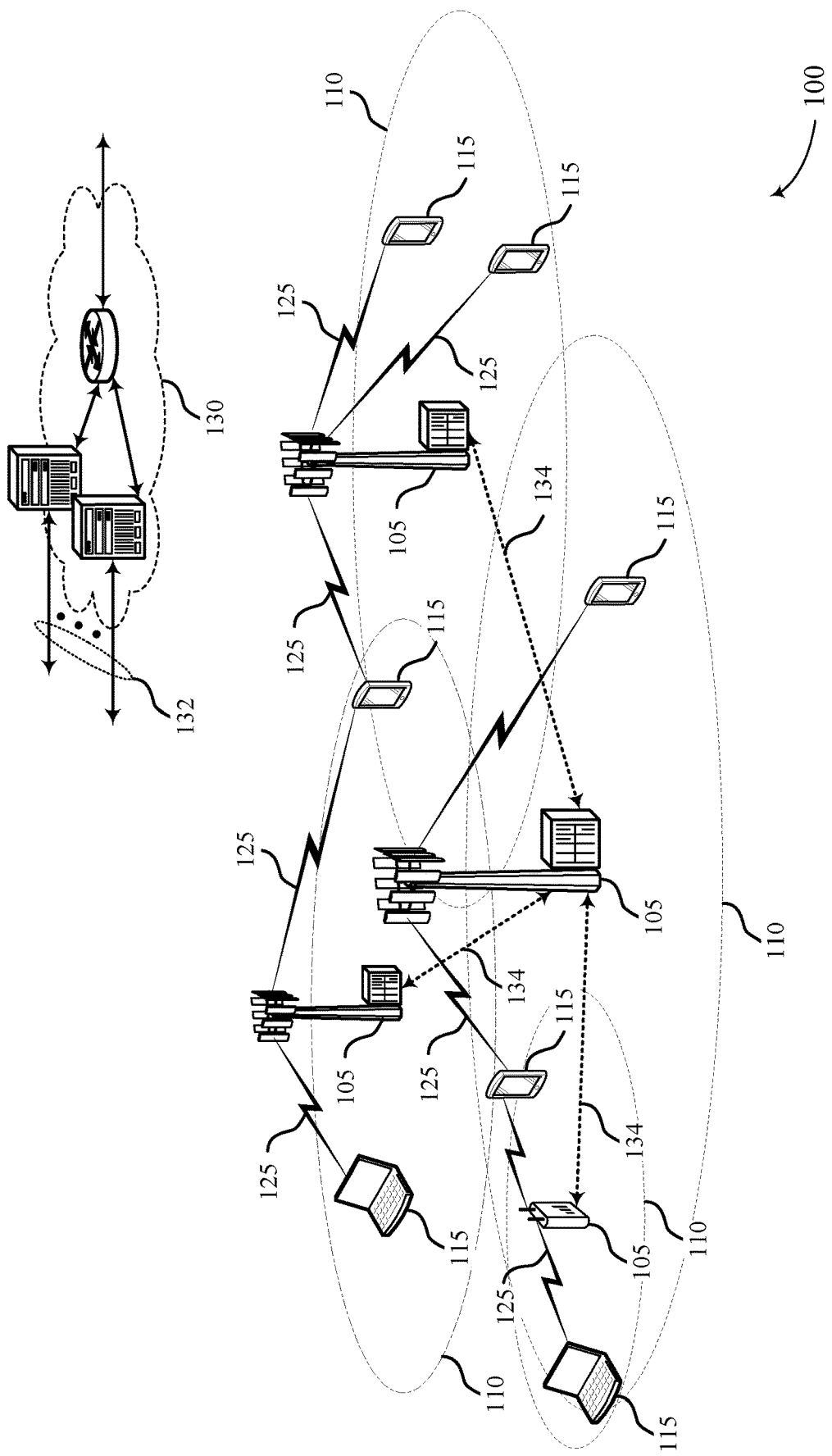
FIG. 1 illustrates an example of a system for wireless communications that supports coefficient determination for measurement report feedback in multi-layer beamformed communications in accordance with aspects of the present disclosure.

In some wireless communications systems (e.g., multiple input-multiple output (MIMO) or multi-user MIMO (MU-MIMO) systems), a user equipment (UE) may report channel state information (CSI) feedback for multiple discrete Fourier transform (DFT) beams across multiple transmission layers. A base station may receive the CSI feedback and determine a precoding matrix for communicating with the UE (e.g., a precoder selected from a linear combination codebook). In some cases, the UE may report a total number of non-zero power DFT beams across all of the transmission layers (e.g., in a CSI part 1 feedback report), and may report quantized complex coefficients associated with measured DFT beams (e.g., based on measured CSI reference signal transmissions in a CSI part 2 feedback report). In some cases, the UE may be configured with a total number of leading beams ($K_{total}$) for which to provide high-resolution quantization feedback (e.g., with four-bits for both amplitude and phase quantization). In such cases, when the total number of non-zero beams across all the transmission layers exceeds the configured total number of leading beams, the UE may report high-resolution quantization feedback for $K_{total}$ non-zero power precoding coefficients having the highest amplitude, and may report low-resolution quantization feedback (e.g., with two bit for both amplitude and phase quantization) for the remaining non-zero power precoding coefficients.

Techniques such as provided herein may allow for flexibility in reporting feedback across multiple spatial layers. In some existing systems, CSI feedback may be provided according to a codebook (e.g., a Type II codebook) in which a precoding matrix may be composed of a spatial domain compression matrix (e.g., $W_1$) and a coefficient matrix (e.g., $W_2$). In some cases, a maximum of two spatial layers are specified (i.e., rank 2), which are composed of the same beam basis. In such systems, a UE may be configured with a number of leading beams to report per transmission layer. However, to increase the throughput for each individual UE that is equipped with more than two receiver antennas, the degree of spatial multiplexing for each individual UE may be increased, which may result in higher feedback overhead if existing techniques were to be used.

By providing an indication of a total number of non-zero coefficients and leading beam determination jointly across spatial layers, techniques provided herein may improve beam coefficient generation and reporting for CSI feedback for higher-rank communications (e.g., rank >2). Such techniques advantageously provide that the feedback CSI bits can be concentrated on the most important beams flexibly and efficiently, and hence enhanced performance and feedback overhead can be provided.

Aspects of the disclosure are initially described in the context of a wireless communications system. Examples of beam coefficient quantization and reporting are then discussed. Aspects of the disclosure are further illustrated by and described with reference to apparatus diagrams, system diagrams, and flowcharts that relate to coefficient determination for measurement report feedback in multi-layer beamformed communications.

FIG. 1 illustrates an example of a wireless communications system 100 that supports coefficient determination for measurement report feedback in multi-layer beamformed communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some wireless communications systems 100, a UE 115 may report CSI feedback for multiple DFT beams on multiple transmission layers. In some cases, the UE 115 may report a total number of non-zero power beams across all of the transmission layers (e.g., in a CSI part 1 report). In some cases, the UE 115 may be configured with a total number of leading beams ($K_{total}$) for which to provide high quantization feedback (e.g., in a CSI part 2 report). In such cases, when the total number of non-zero beams across all the transmission layers exceeds the configured total number of leading beams, the UE 115 may report high-resolution quantization feedback for $K_{total}$ non-zero power precoding coefficients having the highest amplitude coefficients, and may report low-resolution quantization feedback for the remaining non-zero power precoding coefficients. A base station 105 may receive the CSI feedback and use the reported precoding coefficients to determine a precoding matrix for use in a precoding process.

Figure 2:
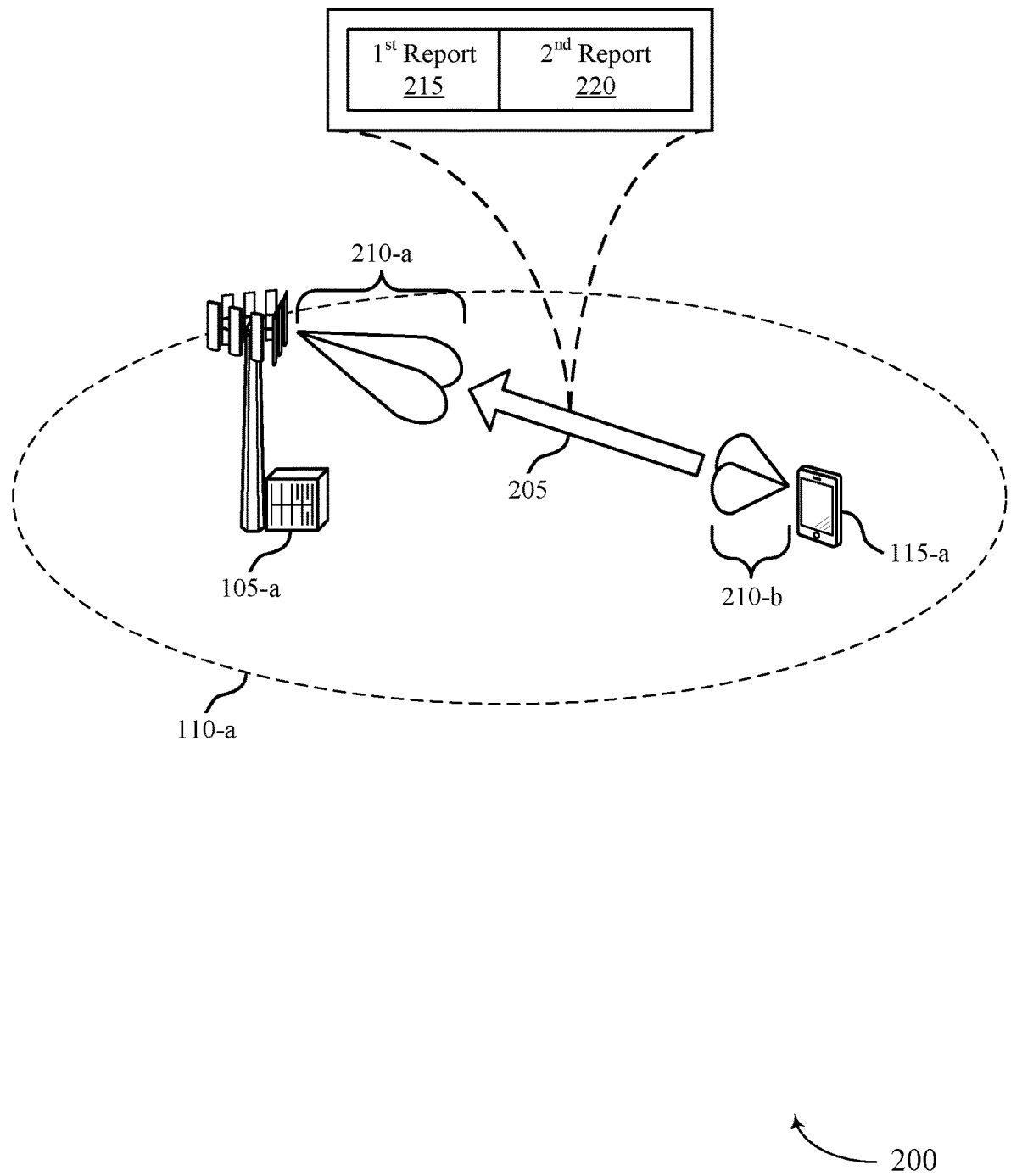
FIG. 2 illustrates an example of a portion of a wireless communications system that supports coefficient determination for measurement report feedback in multi-layer beamformed communications in accordance with aspects of the present disclosure.

FIG. 2 illustrates an example of a wireless communications system 200 that supports coefficient determination for measurement report feedback in multi-layer beamformed communications in accordance with aspects of the present disclosure. In the example of FIG. 2, wireless communications system 200 may include base station 105-a and UE 115-a, which may be examples of the corresponding devices described with respect to FIG. 1. Base station 105-a may provide network coverage for geographic coverage area 110-a. To support multiple input-multiple output (MIMO) communications between base station 105-a and UE 115-a, UE 115-a may transmit CSI feedback to base station 105-a on an uplink channel 205. For example, UE 115-a may transmit the CSI feedback as part of a CSI transmission to base station 105-a. In some cases, for reduced feedback overhead, UE 115-a may transmit information corresponding to the CSI feedback in two reports, a first report 215 and a second report 220, where the second report 220 is decodable using information in the first report 215. Using this two report transmission, UE 115-a may efficiently indicate beam combination coefficients per beam 210 per sub-band.

A UE 115 (e.g., UE 115-a) may measure a CSI reference signal on a number of antenna ports. For example, the number of antenna ports may be configured according to parameters $N_1$ and $N_2$, where the number of antenna ports (e.g., CSI-RS ports) may equal $2N_1N_2$. A number of beams L may be configured, and may be a subset of the set of antenna ports, where the number of beams for CSI feedback may be 2L. The UE 115-a may generate a coefficient matrix (e.g., a linear combination coefficients matrix) that may be used to determine a precoder for transmission. UE 115-a may transmit the CSI feedback to base station 105-a, and base station 105-a may calculate a precoding matrix using the coefficient matrix and pre-configured information (e.g., a spatial domain compression matrix, etc.). Base station 105-a may then select a precoder from a codebook to use for precoding transmissions to UE 115-a, where the precoder is associated with the calculated precoding matrix.

In some cases, UE 115-a may transmit measurement feedback, such as CSI feedback, in a CSI report on an uplink channel 205. This information may contain feedback transmitted using a first report 215 (e.g., CSI part 1) and a second report 220 (e.g. CSI part 2), where the first report 215 and the second report 220 are transmitted with separate channel coding. The separate channel coding may support separate decoding at base station 105-a. The first report 215 may have a relatively small and known payload size (i.e., known to both base station 105-a and UE 115-a). As this first report 215 has a known payload size, base station 105-a may receive the first report 215 and independently decode the first report 215. The second report 220 may have a relatively large payload size, and the payload size of the second report 220 may be variable. Base station 105-a may determine the variable payload size for the second report 220 based on the information decoded from the first report 215 and may decode the second report 220 according to this determined payload size.

In some cases, UE 115-a may transmit the first report 215 (e.g., the first part of the basis subset selection feedback) jointly with a rank indicator (RI), a CSI reference signal RI (CRI), a channel quality indicator (CQI) for a first codeword, or some combination thereof as a first part of a CSI report (e.g., may have individual encoding for each of these parameters). Additionally or alternatively, UE 115-a may transmit the second report 220 which may include amplitude and/or phase coefficients for K linear combination coefficients, CQI for a second codeword, or some combination thereof as a second part of the CSI report. In some cases, the first report 215, the second report 220, or both may be jointly encoded with one or more of these parameters in the CSI report.

Figure 3:
FIG. 3 illustrates an example of a matrix operation for determining a precoding matrix that supports coefficient determination for measurement report feedback in multi-layer beamformed communications in accordance with aspects of the present disclosure.

FIG. 3 illustrates an example of a matrix operation 300 for determining a precoding matrix that supports coefficient determination for measurement report feedback for one transmission layer in accordance with aspects of the present disclosure. In some examples, a matrix operation 300 for determining a precoding matrix may implement aspects of wireless communications system 100 or 200. The matrix operation 300 may be performed by a wireless device (e.g., a base station 105) to determine a precoding matrix 305, W, based on a spatial domain compression matrix 310, $W_1$, and a coefficient matrix 315, $W_2$. To support the precoder, a UE 115 may transmit, to a base station 105, a CSI report, resulting in CSI enhancement for MIMO communications. The base station 105 may determine the precoding matrix 305, W, according to:

$$W = W_1 W_2$$

where the resulting precoding matrix 305, W, has $P=2N_1N_2$ rows (e.g., corresponding to the spatial domain dimensions or a number of antenna port combinations) and $N_3$ columns (e.g., corresponding to the frequency domain dimensions or a number of resource blocks (RBs) or reporting sub-bands).

As described, the spatial domain compression matrix 310, $W_1$, may be an example of a spatial basis, and may consist of L beams per polarization group, resulting in a total of 2L beams considering two polarizations. As such, the spatial domain compression matrix 310 may have dimensions P×2L. The coefficient matrix 315, $W_2$, may alternatively be referred to as a linear combination coefficients matrix and may consist of the linear combination coefficients (e.g., amplitude and co-phasing complex coefficients) for precoding. This coefficient matrix 315 may have dimensions 2L×$N_3$, where $N_3$ is the number of columns, in which each column corresponds to one subband, while the rows of $W_2$ represent the coefficients for one beam in multiple subbands. In some cases, the spatial basis, $W_1$, may be pre-determined at a base station 105. As such, a UE 115 may not report information for this matrix. Instead, the UE 115 may report the coefficient matrix 315, $W_2$, and the base station 105 may determine a precoder based on the reported coefficient matrix 315 and the pre-configured spatial domain compression matrix 310. For example, the base station 105 may perform matrix multiplication as illustrated in the matrix operation 300 to determine a precoding matrix 305 and may select a precoder from a codebook (e.g., a linear combination codebook) based on the calculated precoding matrix 305. In some cases, the base station 105 may store logic for determining the precoder in a codebook closest to (i.e., most similar to) a calculated precoding matrix 305.

In some cases, the quantization resolution of 2L linear combination coefficients can be different based on whether the associated beam is a leading beam or not. In some existing systems, a parameter $K^{(2)}$ is defined to indicate the number of leading beams per layer for each subband. These leading beams have the largest values among a total of 2L wideband amplitudes. The value of $K^{(2)}$ is fixed in the spec based on the value of L (i.e., $K^{(2)}$=4, 6, or 6 for L=2, 3, or 4 respectively). The actual number of leading beams also depends on the number of non-zero-power (NZP) wideband coefficients at each layer, denoted as $M_l$, l=1, . . . , $N_{layer}$, which is report by UE in CSI part 1. In CSI part 2, except the strongest beam whose amplitude is fixed to be 1, for min($K^{(2)}$, $M_l$)−1 leading beams per layer, high-resolution quantization may be used when subband amplitude report is configured (e.g., using 8 PSK for phase quantization and 1-bit for subband amplitude report). All the other beams, referred to as non-leading beams, use low-resolution quantized coefficients (e.g., QPSK for subband phase quantization and no report of subband amplitude). Various aspects of the present disclosure provide that the UE may provide an indication of a total number of non-zero complex coefficients, and that the number of leading beams may be jointly configured across all layers.

FIG. 4 illustrates an example of a leading beam coefficient identification in a matrix operation 400 that supports coefficient determination for measurement report feedback in multi-layer beamformed communications in accordance with aspects of the present disclosure. In some examples, leading beam coefficient identification in a matrix operation 400 may implement aspects of wireless communications system 100 or 200. As indicated above, in some cases higher rank transmissions may be desirable in order to help enhance throughput of a wireless communications system. In the example of FIG. 4, the matrix operation 400 may be performed by a wireless device (e.g., a base station 105) to determine a precoding matrix 405, W, based on a spatial domain compression matrix 410, $W_1$, and a coefficient matrix 415, $W_2$, in a similar manner as discussed with respect to FIG. 3, except that each column of $W_2$ corresponds to one transmission layer instead of one subband. In this example, higher rank feedback may be provided in which the rank is four. It is to be understood that the numbers provided in this example are for purposes of illustration and discussion, and that other ranks of transmissions may be reported for more of fewer subbands.

In this example, coefficient matrix 415 may be a 4 by 4 matrix with complex coefficients. In cases where prior techniques are used to provide a feedback for a specified number of leading beams per layer, such higher layer reporting may result in relatively large feedback overhead, since the total number of leading beams (i.e., the total number of bits for high resolution quantization) is scaled with the number of layers. Further, in such per-layer beam quantization determination techniques, $K^{(2)}$ is fixed for each layer with L selected beams, which may possibly result in some high-importance beams in one or more layers being under-quantized, while some low-importance beams in the other layers are over-quantized. In fact, when the number of layers increase, the beam importance distribution may be different for multiple layers, and a first number of beams are important for one layer while another number of beams are important for the other layer. Thus, the relative importance for one beam is not only dependent on the other beams in the same layer, but also the beams in other layers. The configuration of a total number of leading beams jointly across layers in accordance with techniques of the present disclosure may thus provide enhanced flexibility and efficiency. Examples of determination of leading beams for multiple layers are discussed with respect to FIG. 5.

Figure 5:
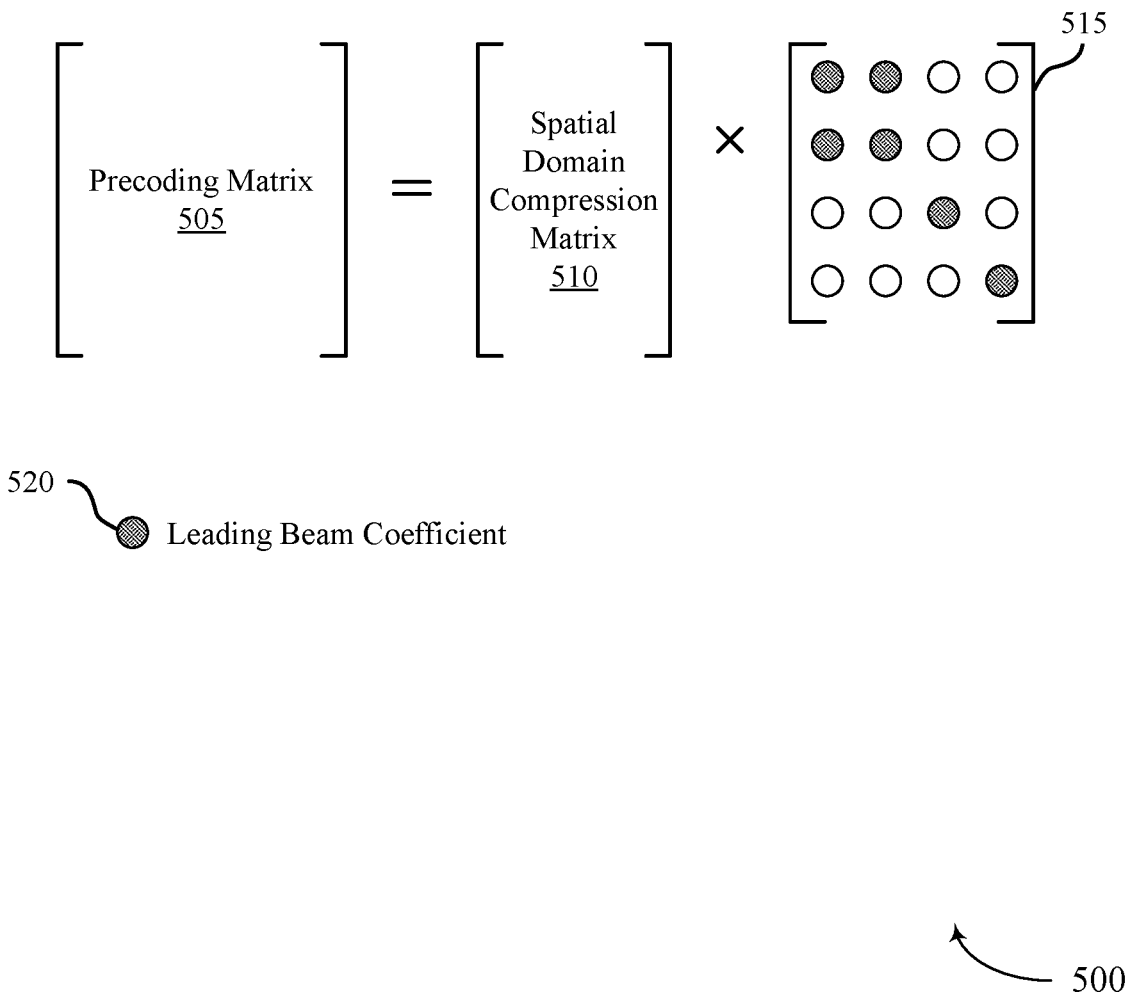
FIG. 5 illustrates an example of a leading beam coefficient identification in a matrix operation that supports coefficient determination for measurement report feedback in multi-layer beamformed communications in accordance with aspects of the present disclosure.

FIG. 5 illustrates an example of a leading beam coefficient identification in a matrix operation 500 that supports coefficient determination for measurement report feedback in multi-layer beamformed communications in accordance with aspects of the present disclosure. In some examples, leading beam coefficient identification in a matrix operation 500 may implement aspects of wireless communications system 100 or 200. As indicated above, in some cases leading beams may be determined jointly across layers for higher rank transmissions. In the example of FIG. 5, the matrix operation 500 may be performed by a wireless device (e.g., a base station 105) to determine a precoding matrix 505, W, based on a spatial domain compression matrix 510, $W_1$, and a coefficient matrix 515, $W_2$, in a similar manner as discussed with respect to FIGS. 3 and 4. In this example, higher rank feedback may be provided in which the rank is four. It is to be understood that the numbers provided in this example are for purposes of illustration and discussion, and that other ranks of transmissions may be reported for more of fewer subbands.

According to some techniques as provided herein, in cases of high-rank CSI feedback with Type II codebook (e.g., rank >2), for CSI part 1, UE may report a total number of non-zero power beams across all the layers (i.e. $M_{total}$). In some cases, relative to reporting of the number of non-zero power beams (i.e., $M_l$) reported per layer, reporting $M_{total}$ can save up to 7 bits of feedback overhead. For example, if $N_{layer}$=4, $M_l$≤8, $M_{total}$≤4×8, then the number of saved bits is $N_{layer}$·log$_2$(max ($M_l$))−log$_2$(max ($M_{total}$)), which equals 7. The value of $M_{total}$ determines the number of non-zero coefficients in CSI Part 2. Further, in some cases, the payload of CSI Part 2 is determined by the total number of non-zero power beams (i.e. $M_{total}$) and also a higher-layer configured (e.g., via RRC signaling) total number of leading beams across all the layers (i.e. $K_{total}$). If $M_{total}$≤$K_{total}$, the $M_{total}$ coefficients will be quantized with the same resolution (e.g., 1-bit subband amplitude and 3-bits subband phase). If $M_{total}$>$K_{total}$, then $K_{total}$ coefficients are reported with high-resolution quantization and the remaining ($M_{total}$−$K_{total}$)

coefficients are reported with low resolution quantization (e.g., 2-bits subband phase only).

In some cases, the number of leading beams per layer (i.e., $K_1$) may then be determined based on sorted wideband amplitude coefficients. In some cases, for high-rank CSI feedback (e.g., with Type II codebook), the beam coefficient quantization may be determined in a cross-layer manner, rather than in a per-layer manner. In such cases, a base station may configure (e.g., via higher-layer signaling such as RRC signaling) a value $K_{total}$ at the UE, which corresponds to the maximum number of leading beams for all layers. A leading beam or leading DFT beam is a beam that has high-resolution quantized subband coefficient. All the other beams, which may be referred to as non-leading beams, have low-resolution quantized subband coefficients. In cases where $M_{total} > K_{total}$, a UE may determine leading beams using one or more different techniques. In some cases, the leading beams for all layers may be jointly determined based on wideband amplitude coefficients, and thus the number of leading beams may be different for each layer. For example, a UE may determine the leading beams based on an original amplitude of wideband beam coefficients of all layers jointly. In such examples, the beams of all layers may be sorted in descending order according to the amplitude of original wideband beam coefficients that are determined based on CSI reference signal measurements at the UE, in which case the amplitude of the strongest beam for each layer is 1. The $K_{total}$ beams having the largest values are determined as leading beams. In the determination results, the number of leading beams for each layer is recorded as $K_i$, $i=1, \ldots, N_{layer}$, and the sum$(K_i) = K_{total}$.

In other cases, a UE may determine the leading beams based on normalized amplitudes of wideband beam coefficients of all layers jointly. In such cases, the amplitude of wideband beam coefficients are power normalized per layer, so that the sum power of normalized coefficients for each layer is one. Then, the beams of all layers are sorted in descending order according to the normalized amplitude values, and the $K_{total}$ beams with the largest values are determined as leading beams.

In one specific example, a UE may be configured with a number of layers as $N_{layer}=4$, the high-layer configured beam basis size is $2L=4$, and the high-layer configured number of leading beams for all layers is $K_{total}=6$. The UE may measure one or more CSI reference signal transmissions and determine original amplitudes of wideband beam coefficients of all layers as the absolute value of wideband component of $W_2$, namely:

$$P_{WB} = \begin{bmatrix} 1 & 1 & \sqrt{1/32} & \sqrt{1/32} \\ \sqrt{1/2} & \sqrt{1/4} & \sqrt{1/32} & \sqrt{1/32} \\ \sqrt{1/32} & \sqrt{1/16} & 1 & \sqrt{1/8} \\ \sqrt{1/64} & \sqrt{1/16} & \sqrt{1/8} & 1 \end{bmatrix}.$$

The UE may then sort the elements in $P_{WB}$ and then select the beams corresponding to the largest $K_{total}$ elements as the leading beams whose beam coefficients in $W_2$ are quantized with high resolution, as shown in $$\begin{bmatrix} 1 & 1 & \sqrt{1/32} & \sqrt{1/32} \\ \sqrt{1/2} & \sqrt{1/4} & \sqrt{1/32} & \sqrt{1/32} \\ \sqrt{1/32} & \sqrt{1/16} & 1 & \sqrt{1/8} \\ \sqrt{1/64} & \sqrt{1/16} & \sqrt{1/8} & 1 \end{bmatrix},$$

where leading beams are shown in bold, corresponding to leading beam coefficients 520 of coefficient matrix 515 of FIG. 5. The beam coefficients for the remaining beams in $W_2$ are quantized with low resolution.

Continuing with the above example, in cases where the original amplitudes of wideband beam coefficients of all layers in $P_{WB}$ are power normalized to $P'_{WB}$, where the sum power (i.e., the sum of the squared value of each coefficient in the matrix) of each column in $P'_{WB}$ is equal to 1, as shown in $$\begin{bmatrix} 0.8040 & 0.8528 & 0.1622 & 0.1622 \\ 0.5685 & 0.4264 & 0.1622 & 0.1622 \\ 0.1421 & 0.2132 & 0.9177 & 0.3244 \\ 0.1005 & 0.2132 & 0.3244 & 0.9177 \end{bmatrix}.$$

The UE may then sort the elements in $P'_{WB}$ and then select the beams corresponding to the largest $K_{total}$ elements (shown in bold, which also correspond to leading beam coefficients 520 of FIG. 5) as the leading beams whose beam coefficients in $W_2$ are quantized with high resolution. The beam coefficients for the remaining beams in $W_2$ are quantized with low resolution.

In some cases, in order to provide fairness among layers, a minimum value $K_{min}$ and a maximum value $K_{max}$ may be configured (e.g., specified or signaled to the UE in higher layer signaling). The determination results may then provide that $K_{min} \leq K_i \leq K_{max}$. The value of $K_{min}$ and $K_{max}$ may be fixed by specification (e.g., $K_{min}=1$ and $K_{max}=4$, 6, or 6 for L=2, 3 or 4) or signaled to the UE (e.g., via RRC signaling). In cases where two normalized coefficients have identical power, one or more rules may be used to determine which is a leading beam. For example, a beam with a lower layer index may be prioritized first, and then secondly a beam with lower beam index may be prioritized.

In other cases, leading beams may be allocated to all layers evenly. In such cases, if $K_{total}/N_{layer}$ is not an integer, two possible numbers of leading beams can be allocated, such as by: $K_1 = \text{ceil}(K_{total}/N_{layer})$ and $K_2 = \text{floor}(K_{total}/N_{layer})$. The first $\text{Mod}(K_{total}, N_{layer})$ layers each have $K_1$ leading beams, and the remaining $N_{layer} - \text{Mod}(K_{total}, N_{layer})$ layers each have $K_2$ leading beams.

In other cases, leading beams may be allocated to layers according to a higher layer configuration (e.g., via RRC signaling). In such cases, a base station may signal the number of leading beams that are to be reported using high-resolution quantization for each spatial layer. For example, a vector of $\{K_{tot,l}\}_{l=1}^{N_{layer}}$ may be configured that provides a mapping of the number of leading beams and layers, with each element in the vector corresponding to one layer or a layer group. Such as approach may allow the base station to have full control over leading beam reporting. In some cases, the configuration may be semi-static, and updates may be provided periodically or based on an event (e.g., changed channel conditions). In some cases, all the transmission layers can be divided into two or more groups, and each layer group is configured with a total number of leading beams by $\{K_{tot,l'}\}_{l'=1}^{N_{layer\_group}}$.

In still further cases, leading beams may be determined based on measured channel conditions for each layer. For example, a base station may configure two values of $K_{tot,1}$ and $K_{tot,2}$ with the first value used for the group of strongest layers (i.e., layers having most favorable channel conditions) and the second value used for all the other layers. In some cases, the first value is used for the strongest transmission layer that is identified by Layer Indicator (LI), which is determined by UE and reported to base station, and the second value is used for all the other layers. In some cases, the base station may configure more than two values of leading beams of a group of layers, and different threshold values may be used to determine which group of layers use which particular number of leading beams.

Additionally, in some cases a UE may report a lower rank (e.g., rank indication=1 or 2). In such cases, existing leading beam determination methods employed for lower rank transmissions may be used (e.g., a per-layer determination method with a common number of leading beams for each layer). In other cases, for lower rank reporting, the UE may use the same cross-layer approach for higher rank (e.g., rank indication of 3 or 4). In such cases, a different $K_{total}$ may be configured only for rank 1 and 2 (i.e., the value of $K_{total}$ can be adjusted according to the rank value). Further, in some cases, higher-layer signaling may be used to indicate which technique is to be used to allocate leading beams per layer (e.g., a one-bit indicator may be provided to indicate per-layer leading beam determination or cross-layer leading beam determination).

Figure 6:
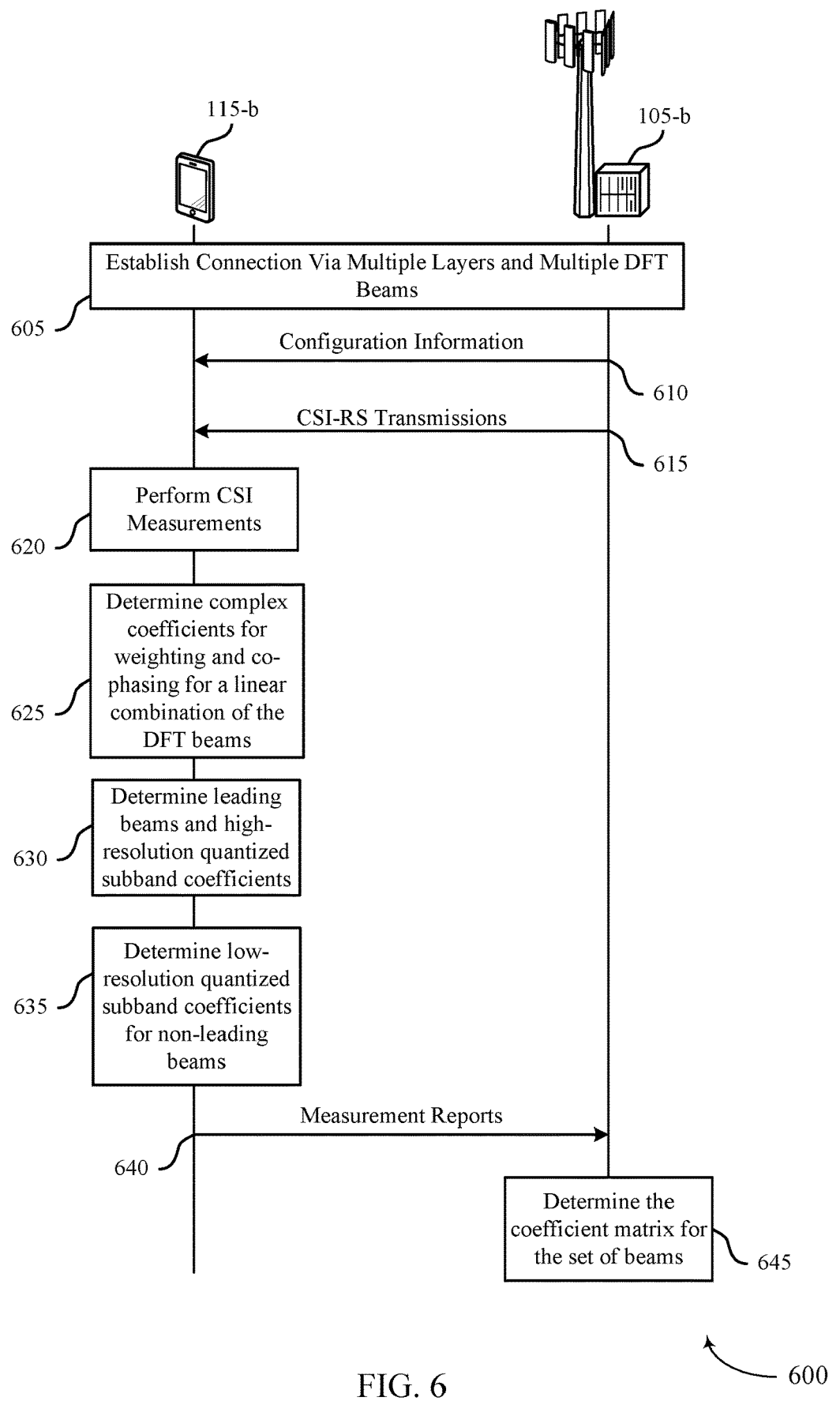
FIG. 6 illustrates an example of a process flow that supports coefficient determination for measurement report feedback in multi-layer beamformed communications in accordance with aspects of the present disclosure.

FIG. 6 illustrates an example of a process flow 600 that supports coefficient determination for measurement report feedback in multi-layer beamformed communications in accordance with aspects of the present disclosure. In some examples, process flow 600 may implement aspects of wireless communications system 100 or 200. The process flow 600 may include a base station 105-b and a UE 115-b, which may be examples of the corresponding devices described with reference to FIGS. 1 and 2. UE 115-b may transmit CSI feedback that indicates a total number on non-zero beams, and provides quantized complex coefficients that include high-resolution quantized coefficients for leading beams, and low-resolution quantized coefficients for non-leading beams. Alternative examples of the following may be implemented, where some steps are performed in a different order than described or are not performed at all. In some cases, steps may include additional features not mentioned below, or further steps may be added.

At 605, UE 115-b and base station 105-b may establish a connection. The connection may be established according to established RRC connection establishment techniques, and may the connection may be configured for multiple spatial transmission layers and multiple DFT beams. The base station 105-b, at 610, may transmit configuration information to the UE 115-b. In some cases, the configuration information may include information related to a maximum number of leading beams that are to be reported using high-resolution quantized coefficients, a maximum number of leading beams to be reported per layer, a minimum number of leading beams to be reported per layer, a configured number of leading beams for one or more particular layers, whether to use per-layer or cross-layer leading beam determination, or any combinations thereof. In some cases, the configuration information may be provided as part on the connection establishment.

At 615, the base station 105-b may transmit one or more CSI reference signals for measurement at the UE 115-b. The CSI reference signals may be transmitted using multiple DFT beams, and, at 620, may be measured at multiple antenna ports at the UE 115-b.

At 625, the UE 115-b may determine complex coefficients for weighting and co-phasing for a linear combination of the DFT beams. The complex coefficients may be determined based on the CSI measurements at each configured antenna port.

At 630, the UE 115-b may determine leading beams and high-resolution quantized subband coefficients for the leading beams. In some cases, the leading beams may be determined across the different layers according to cross-layer techniques such as discussed with respect to FIGS. 2 through 5. At 630, the UE 115-b may determine non-leading beams as beams other than leading beams, and low-resolution quantized subband coefficients for the non-leading beams. In some cases, the high-resolution quantized coefficients may use 8 PSK for phase quantization and 1-bit for subband amplitude, and the low-resolution quantized coefficients may use QPSK for subband phase quantization with no report of subband amplitude. At 640, the UE 115-b may transmit measurement report(s) to the base station 105-b. In some cases, the measurement reports include a CSI part 1 report that includes an indication of a total number of non-zero coefficients, and a CSI part 2 report that includes the coefficients as quantized according to quantization techniques such as discussed herein.

At 645, the base station 105-b may receive the measurement report(s) and determine a coefficient matrix for the DFT beams. Base station 105-b may use the coefficient matrix, along with a spatial domain compression matrix, to determine a precoding matrix (e.g., a precoder from a linear combination codebook). Base station 105-b may use the determined precoding matrix for communicating with UE 115-b.

The operations performed by the base station 105-b and the UE 115-b as part of, but not limited to, process flow 600 may provide improvements to base station 105-b and UE 115-b CSI reporting procedures. For example, by providing an indication of a total number of non-zero coefficients and leading beam determination jointly across spatial layers, such CSI reporting procedures may improve beam coefficient generation and reporting for CSI feedback for higher-rank communications (e.g., rank >2). Further, the operations performed by the base station 105-b and the UE 115-b as part of, but not limited to, process flow 600 may provide benefits and enhancements in that the feedback CSI bits can be concentrated on the most important beams flexibly and efficiently, and hence enhanced performance and feedback overhead can be provided, among other advantages.

Figure 7:
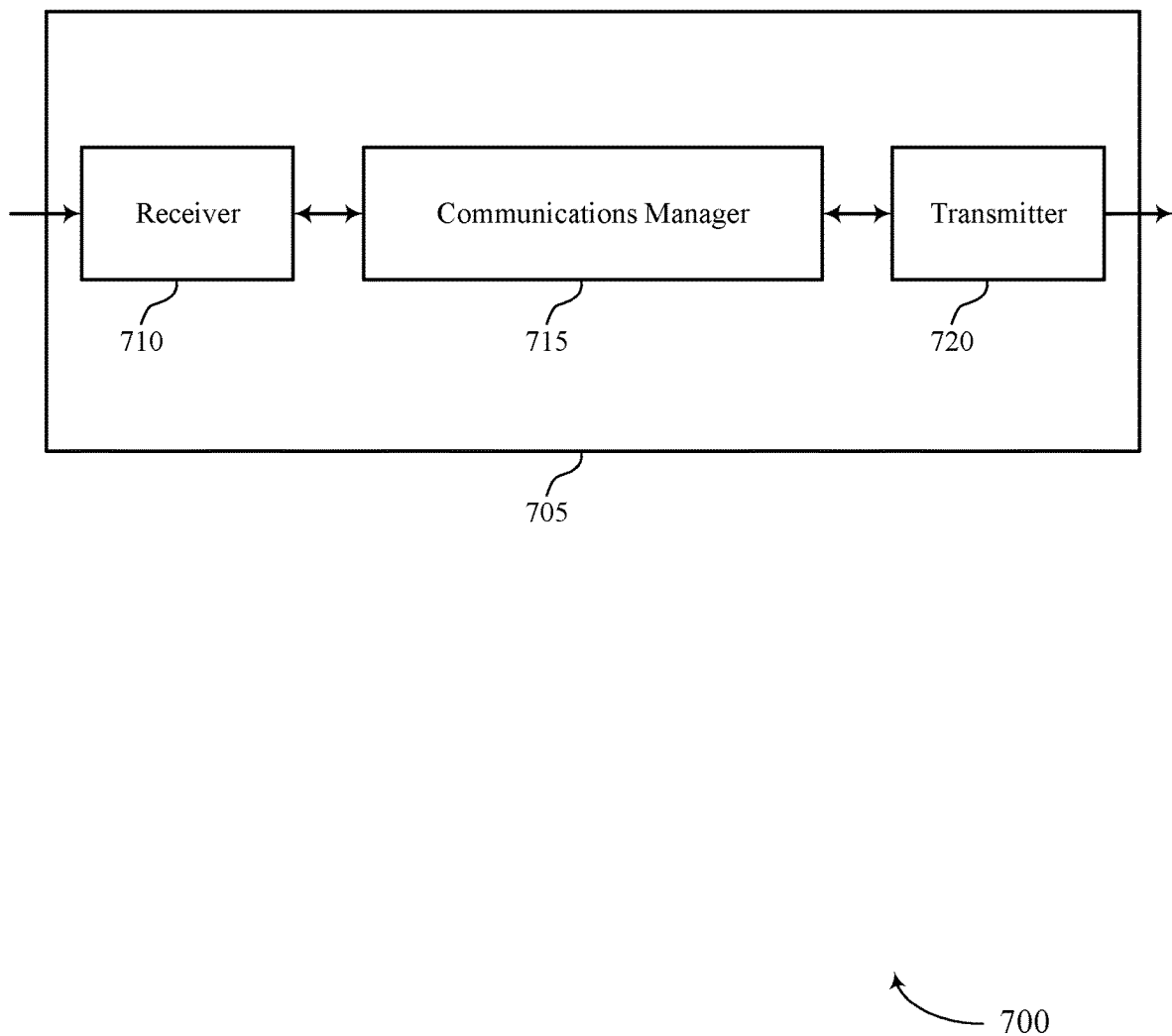
FIGS. 7 and 8 show block diagrams of devices that support coefficient determination for measurement report feedback in multi-layer beamformed communications in accordance with aspects of the present disclosure.

FIG. 7 shows a block diagram 700 of a device 705 that supports coefficient determination for measurement report feedback in multi-layer beamformed communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to coefficient determination for measurement report feedback in multi-layer beamformed communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may perform CSI measurements on one or more reference signal transmissions from a base station, determine, based on the CSI measurements, a set of complex coefficients for weighting and co-phasing for a linear combination of a number of DFT beams of a set of transmission layers of the base station, where a first set of the DFT beams each have a complex coefficient of zero and a second set of the DFT beams each have a non-zero complex coefficient, determine a total number of leading beams jointly across the plurality of transmission layers and corresponding non-zero complex coefficients of the second set of the plurality of DFT beams, where the total number of leading beams is equal to a minimum value between the determined total number of DFT beams having non-zero complex coefficient across all the transmission layers and a configured maximum number of leading beams across all the transmission layers, quantize the set of complex coefficients of the second set of the DFT beams, and transmit a measurement report to the base station, where the measurement report includes at least an indication of the total number of the non-zero complex coefficients and the quantized non-zero complex coefficients for linear combinations of the set of DFT beams. The communications manager 715 may be an example of aspects of the communications manager 1010 described herein.

The communications manager 715 may as described herein be implemented to realize one or more potential advantages. One implementation may allow the device 705 to provide an indication of a total number of non-zero coefficients and leading beam determination jointly across spatial layers, and such CSI reporting procedures may improve beam coefficient generation and reporting for CSI feedback for higher-rank communications. Further, implementations may allow the device 705 to provide feedback CSI bits that are concentrated on the most important beams flexibly and efficiently, and hence enhanced performance and feedback overhead can be provided, among other advantages.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
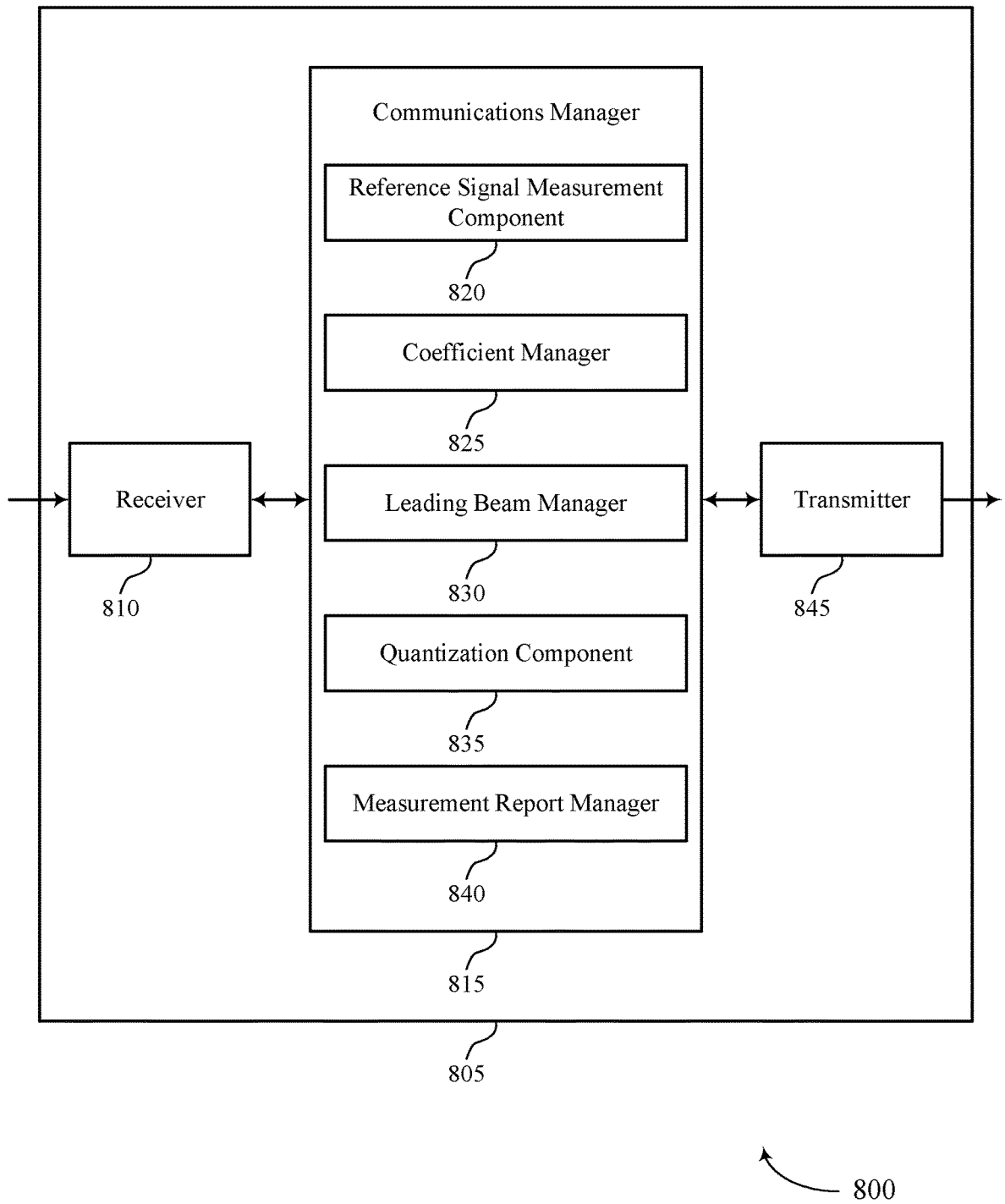

FIG. 8 shows a block diagram 800 of a device 805 that supports coefficient determination for measurement report feedback in multi-layer beamformed communications in accordance with aspects of the present disclosure. The device 805 may be an example of aspects of a device 705, or a UE 115 as described herein. The device 805 may include a receiver 810, a communications manager 815, and a transmitter 845. The device 805 may also include a processor. Each of these components may be in communication with one another (e.g., via one or more buses).

The receiver 810 may receive information such as packets, user data, or control information associated with various information channels (e.g., control channels, data channels, and information related to coefficient determination for measurement report feedback in multi-layer beamformed communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a reference signal measurement component 820, a coefficient manager 825, a leading beam manager 830, a quantization component 835, and a measurement report manager 840. The communications manager 815 may be an example of aspects of the communications manager 1010 described herein.

The reference signal measurement component 820 may perform CSI measurements on one or more reference signal transmissions from a base station.

The coefficient manager 825 may determine, based on the CSI measurements, a set of complex coefficients for weighting and co-phasing for a linear combination of a number of DFT beams of a set of transmission layers of the base station, where a first set of the DFT beams each have a complex coefficient of zero and a second set of the DFT beams each have a non-zero complex coefficient.

The leading beam manager 830 may determine a total number of leading beams jointly across the plurality of transmission layers and corresponding non-zero complex coefficients of the second set of the plurality of DFT beams, where the total number of leading beams is equal to a minimum value between the determined total number of DFT beams having non-zero complex coefficient across all the transmission layers and a configured maximum number of leading beams across all the transmission layers.

The quantization component 835 may quantize the set of complex coefficients of the second set of the DFT beams.

The measurement report manager 840 may transmit a measurement report to the base station, where the measurement report includes at least an indication of the total number of the non-zero complex coefficients and the quantized non-zero complex coefficients for linear combinations of the set of DFT beams.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
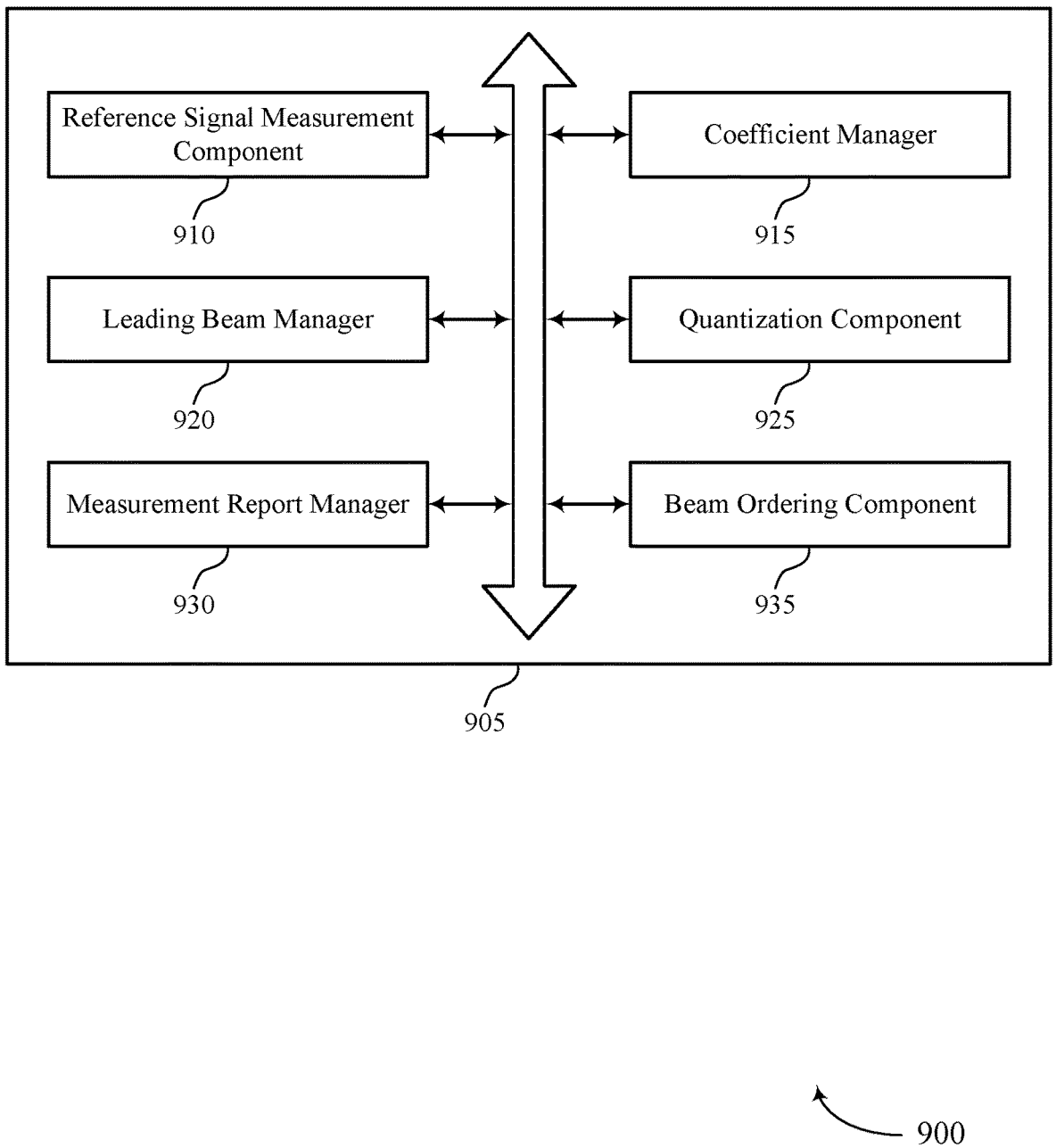
FIG. 9 shows a block diagram of a communications manager that supports coefficient determination for measurement report feedback in multi-layer beamformed communications in accordance with aspects of the present disclosure.

FIG. 9 shows a block diagram 900 of a communications manager 905 that supports coefficient determination for measurement report feedback in multi-layer beamformed communications in accordance with aspects of the present disclosure. The communications manager 905 may be an example of aspects of a communications manager 715, a communications manager 815, or a communications manager 1010 described herein. The communications manager 905 may include a reference signal measurement component 910, a coefficient manager 915, a leading beam manager 920, a quantization component 925, a measurement report manager 930, and a beam ordering component 935. Each of these modules may communicate, directly or indirectly, with one another (e.g., via one or more buses).

The reference signal measurement component 910 may perform CSI measurements on one or more reference signal transmissions from a base station.

The coefficient manager 915 may determine, based on the CSI measurements, a set of complex coefficients for weighting and co-phasing for a linear combination of a number of DFT beams of a set of transmission layers of the base station, where a first set of the DFT beams each have a complex coefficient of zero and a second set of the DFT beams each have a non-zero complex coefficient.

The leading beam manager 920 may determine a total number of leading beams jointly across the plurality of transmission layers and corresponding non-zero complex coefficients of the second set of the plurality of DFT beams, where the total number of leading beams is equal to a minimum value between the determined total number of DFT beams having non-zero complex coefficient across all the transmission layers and a configured maximum number of leading beams across all the transmission layers. In some examples, the leading beam manager 920 may receive, from the base station, an indication of the total number of leading beams for the set of transmission layers. In some examples, the leading beam manager 920 may identify a first subset of beams from the second set of DFT beams that are leading beams based on the total number of leading beams, and a second subset of beams from the DFT beams as non-leading beams that are outside of the first subset of beams.

In some examples, the leading beam manager 920 may determine a number of leading beams for each transmission layer based on a wideband amplitude coefficient of each DFT beam associated with each transmission layer. In some examples, leading beams for all of the transmission layers are jointly determined based on wideband amplitude coefficients associated with each DFT beam, and where different transmission layers are capable of having different numbers of leading beams. In some cases, each transmission layer has a minimum number of leading beams and a maximum number of leading beams, and where the number of leading beams for each transmission layer is further based on the minimum number of leading beams and the maximum number of leading beams.

In some examples, the leading beam manager 920 may determine a number of leading beams for each transmission layer based on an even allocation of leading beams among each of the transmission layers. In some examples, the leading beam manager 920 may determine a number of leading beams for each transmission layer based on a configured mapping of the number of leading beams for each transmission layer.

In some examples, the leading beam manager 920 may determine a number of leading beams for each transmission layer based on a first number of leading beams configured for each of one or more transmission layers having higher measured channel conditions than one or more other transmission layers, and a second number of leading beams configured for each remaining transmission layer. In some cases, the number of leading beams is configured by the base station, and where when the number of leading beams divided by a number of the set of transmission layers is a non-integer, one or more transmission layers are selected to have one or more additional leading beams based on a layer index.

The quantization component 925 may quantize the set of complex coefficients of the second set of the DFT beams. In some cases, a high-resolution quantized subband coefficient is provided for each leading beam of the first subset of beams, and where a low-resolution quantized subband coefficient is provided for each beam of the second subset of beams.

The measurement report manager 930 may transmit a measurement report to the base station, where the measurement report includes at least an indication of the total number of the non-zero complex coefficients and the quantized non-zero complex coefficients for linear combinations of the set of DFT beams. In some cases, the measurement report is a first measurement report provided based on a number of the set of transmission layers exceeding a threshold value, and where a second measurement report is provided based on the number of transmission layers being at or below the threshold value, and where a number of leading beams associated with the first measurement report is different than a number of leading beams associated with the second measurement report.

The beam ordering component 935 may sort DFT beams according to a wideband amplitude coefficient of each DFT beam. In some cases, beam ordering component 935 may normalize the wideband amplitude coefficient of each DFT beam such that a sum power of normalized wideband amplitude coefficients for each layer equals one, and may sort all of the DFT beams of all of the transmission layers in descending order according to the normalized wideband amplitude coefficients. In some examples, the beam ordering component 935 may select DFT beams with the largest normalized wideband amplitude coefficients as the number of leading beams. In some examples, when two DFT beams have identical normalized wideband amplitudes coefficients, a beam having a lower layer index is selected as a leading beam ahead of a DFT beam having a higher layer index, and a DFT beam having a lower beam index is selected as a leading beam ahead of a DFT beam having a higher beam index.

In some cases, the wideband amplitude coefficient of each DFT beam is an unadjusted wideband amplitude coefficient associated with each DFT beam, and where all of the DFT beams of all of the transmission layers are sorted in descending order according to the unadjusted wideband amplitude of each DFT beam, and DFT beams with the largest unadjusted wideband amplitudes are selected as the number of leading beams.

Figure 10:
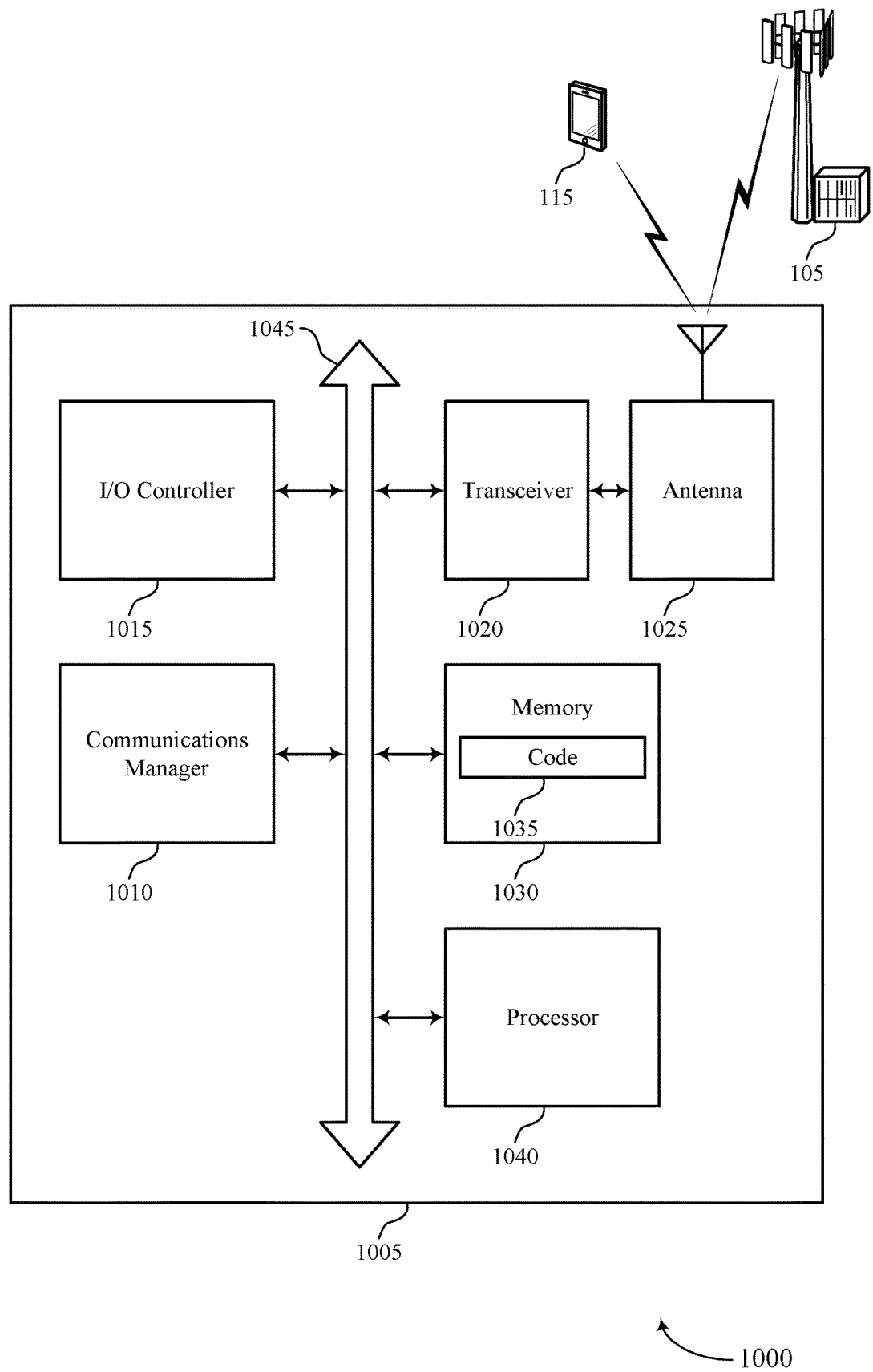
FIG. 10 shows a diagram of a system including a device that supports coefficient determination for measurement report feedback in multi-layer beamformed communications in accordance with aspects of the present disclosure.

FIG. 10 shows a diagram of a system 1000 including a device 1005 that supports coefficient determination for measurement report feedback in multi-layer beamformed communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may perform CSI measurements on one or more reference signal transmissions from a base station, determine, based on the CSI measurements, a set of complex coefficients for weighting and co-phasing for a linear combination of a set of DFT beams of a set of transmission layers of the base station, where a first set of the DFT beams each have a complex coefficient of zero and a second set of the DFT beams each have a non-zero complex coefficient, determine a total number of leading beams jointly across the plurality of transmission layers and corresponding non-zero complex coefficients of the second set of the plurality of DFT beams, where the total number of leading beams is equal to a minimum value between the determined total number of DFT beams having non-zero complex coefficient across all the transmission layers and a configured maximum number of leading beams across all the transmission layers, quantize the set of complex coefficients of the second set of the DFT beams, and transmit a measurement report to the base station, where the measurement report includes at least an indication of the total number of the non-zero complex coefficients and the quantized non-zero complex coefficients for linear combinations of the set of DFT beams.

The device 1105 may as described herein be implemented to realize one or more potential advantages. One implementation may allow the device 1105 to provide an indication of a total number of non-zero coefficients and leading beam determination jointly across spatial layers, and such CSI reporting procedures may improve beam coefficient generation and reporting for CSI feedback for higher-rank communications. Further, implementations may allow the device 1105 to provide feedback CSI bits that are concentrated on the most important beams flexibly and efficiently, and hence enhanced performance and feedback overhead can be provided, among other advantages.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting coefficient determination for measurement report feedback in multi-layer beamformed communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
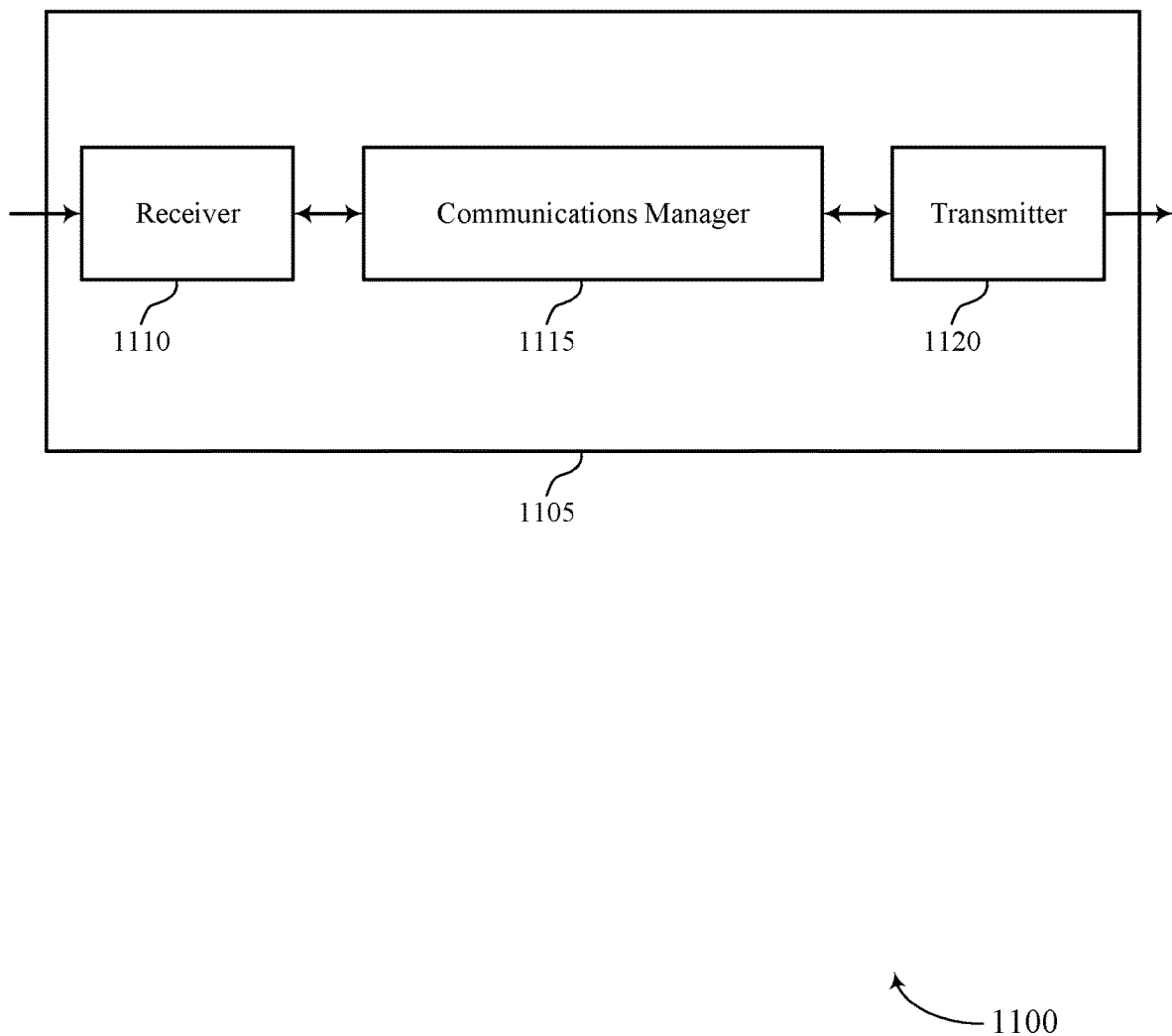
FIGS. 11 and 12 show block diagrams of devices that support coefficient determination for measurement report feedback in multi-layer beamformed communications in accordance with aspects of the present disclosure.

FIG. 11 shows a block diagram 1100 of a device 1105 that supports coefficient determination for measurement report feedback in multi-layer beamformed communications in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to coefficient determination for measurement report feedback in multi-layer beamformed communications, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may establish a connection with a UE via a set of transmission layers, where each transmission layer uses two or more DFT beams for communications between the UE and the base station, transmit one or more reference signal transmissions to the UE on the set of transmission layers, and receive a measurement report from the UE based on the one or more reference signal transmissions, the measurement report including complex coefficients for linear combinations of the set of DFT beams, where a first set of the DFT beams each have a complex coefficient of zero and a second set of the DFT beams each have a non-zero complex coefficient, and the measurement report indicates a total number of transmission beams in the second set of DFT beams. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
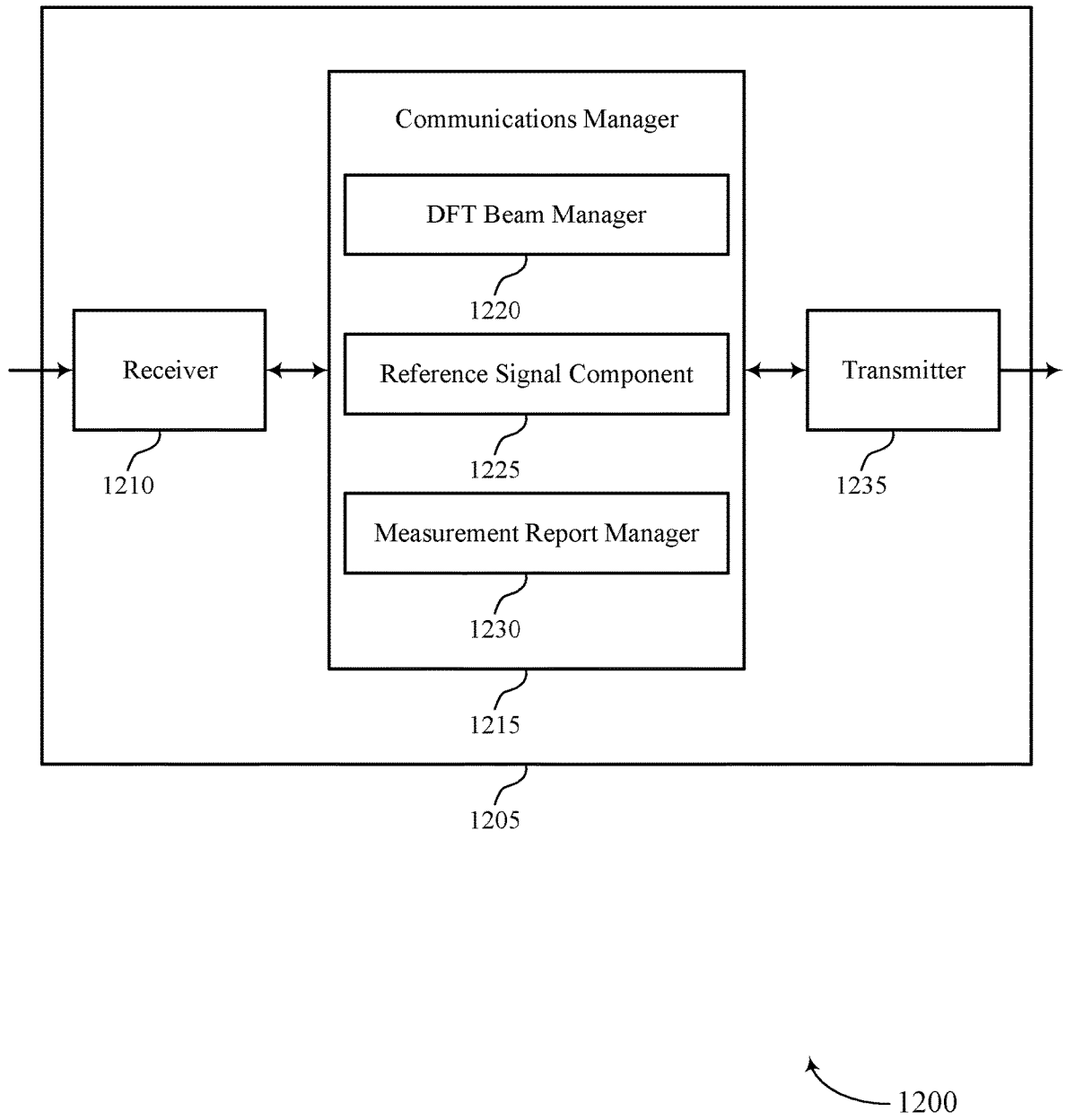

FIG. 12 shows a block diagram 1200 of a device 1205 that supports coefficient determination for measurement report feedback in multi-layer beamformed communications in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to coefficient determination for measurement report feedback in multi-layer beamformed communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a DFT beam manager 1220, a reference signal component 1225, and a measurement report manager 1230. The communications manager 1215 may be an example of aspects of the communications manager 1410 described herein.

The DFT beam manager 1220 may establish a connection with a UE via a set of transmission layers, where each transmission layer uses two or more DFT beams for communications between the UE and the base station.

The reference signal component 1225 may transmit one or more reference signal transmissions to the UE on the set of transmission layers.

The measurement report manager 1230 may receive a measurement report from the UE based on the one or more reference signal transmissions, the measurement report including complex coefficients for linear combinations of the set of DFT beams, where a first set of the DFT beams each have a complex coefficient of zero and a second set of the DFT beams each have a non-zero complex coefficient, and the measurement report indicates a total number of transmission beams in the second set of DFT beams.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
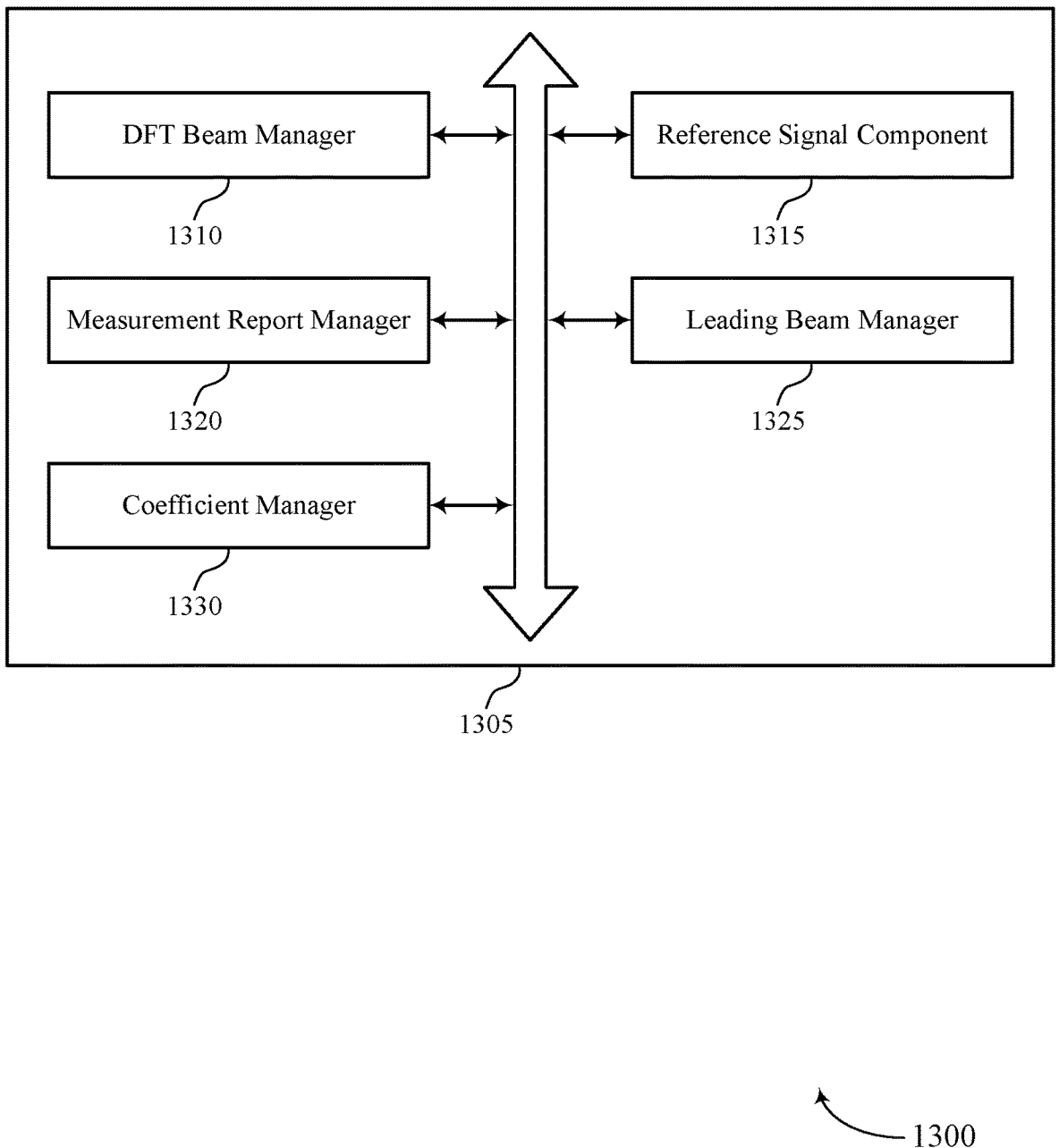
FIG. 13 shows a block diagram of a communications manager that supports coefficient determination for measurement report feedback in multi-layer beamformed communications in accordance with aspects of the present disclosure.

FIG. 13 shows a block diagram 1300 of a communications manager 1305 that supports coefficient determination for measurement report feedback in multi-layer beamformed communications in accordance with aspects of the present disclosure. The communications manager 1305 may be an example of aspects of a communications manager 1115, a communications manager 1215, or a communications manager 1410 described herein. The communications manager 1305 may include a DFT beam manager 1310, a reference signal component 1315, a measurement report manager 1320, a leading beam manager 1325, and a coefficient manager 1330. Each of these modules may communicate, directly or indirectly, with one another (e.g., via one or more buses).

The DFT beam manager 1310 may establish a connection with a UE via a set of transmission layers, where each transmission layer uses two or more DFT beams for communications between the UE and the base station.

The reference signal component 1315 may transmit one or more reference signal transmissions to the UE on the set of transmission layers.

The measurement report manager 1320 may receive a measurement report from the UE based on the one or more reference signal transmissions, the measurement report including complex coefficients for linear combinations of the set of DFT beams, where a first set of the DFT beams each have a complex coefficient of zero and a second set of the DFT beams each have a non-zero complex coefficient, and the measurement report indicates a total number of transmission beams in the second set of DFT beams.

In some cases, the measurement report is a first measurement report provided based on a number of the set of transmission layers at the UE exceeding a threshold value, and where a second measurement report is provided based on the number of transmission layers being at or below the threshold value, and where a number of leading beams associated with the first measurement report is different than a number of leading beams associated with the second measurement report.

The leading beam manager 1325 may transmit, to the UE, an indication of a total number of leading beams. In some examples, the leading beam manager 1325 may identify, based on a number of DFT beams in the second set of DFT beams and the total number of leading beams, a first subset of beams from the second set of DFT beams that are leading beams, and a second subset of beams from the second set of DFT beams as beams that are outside of the first subset of beams. In some examples, the leading beam manager 1325 may determine a number of leading beams for each transmission layer based on a wideband amplitude coefficient of each DFT beam associated with each transmission layer. In some examples, the leading beams for all of the transmission layers are jointly determined based on wideband amplitude coefficients associated with each DFT beam, and where different transmission layers are capable of having different numbers of leading beams.

In some examples, the leading beam manager 1325 may determine a number of leading beams for each transmission layer based on an even allocation of leading beams among each of the transmission layers. In some examples, the leading beam manager 1325 may configure the number of leading beams at the UE, and where, when the number of leading beams divided by a number of the set of transmission layers is a non-integer, one or more transmission layers are configured to have one or more additional leading beams based on a layer index. In some examples, the leading beam manager 1325 may configure the number of leading beams at each transmission layer for the UE. In some examples, the leading beam manager 1325 may transmit a mapping of the number of leading beams at each transmission layer to the UE. In some examples, the leading beam manager 1325 may configure different numbers of leading beams for different transmission layers based on measured channel conditions at the UE.

In some cases, each transmission layer has a minimum number of leading beams and a maximum number of leading beams, and where the number of leading beams for each transmission layer is further based on the minimum number of leading beams and the maximum number of leading beams.

The coefficient manager 1330 may receive wideband coefficients from UEs and determine a coefficient matrix for a precoding procedure. In some cases, the measurement report includes, for the first subset of beams, a high-resolution quantized subband coefficient for each leading beam of the first subset of beams, and where a low-resolution quantized subband coefficient is provided for each beam of the second subset of beams.

Figure 14:
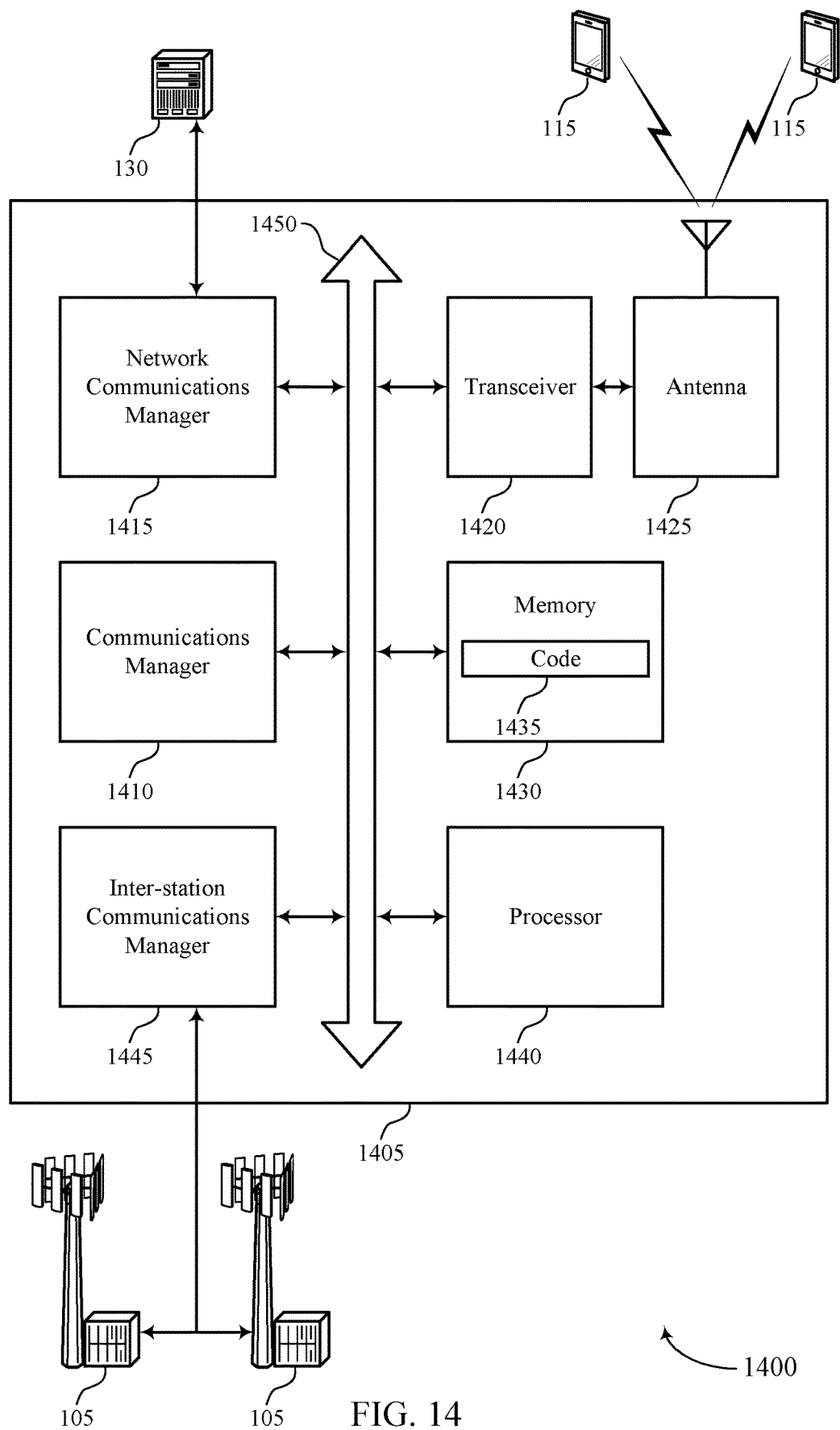
FIG. 14 shows a diagram of a system including a device that supports coefficient determination for measurement report feedback in multi-layer beamformed communications in accordance with aspects of the present disclosure.

FIG. 14 shows a diagram of a system 1400 including a device 1405 that supports coefficient determination for measurement report feedback in multi-layer beamformed communications in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may establish a connection with a UE via a set of transmission layers, where each transmission layer uses two or more DFT beams for communications between the UE and the base station, transmit one or more reference signal transmissions to the UE on the set of transmission layers, and receive a measurement report from the UE based on the one or more reference signal transmissions, the measurement report including complex coefficients for linear combinations of the set of DFT beams, where a first set of the DFT beams each have a complex coefficient of zero and a second set of the DFT beams each have a non-zero complex coefficient, and the measurement report indicates a total number of transmission beams in the second set of DFT beams.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting coefficient determination for measurement report feedback in multi-layer beamformed communications).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
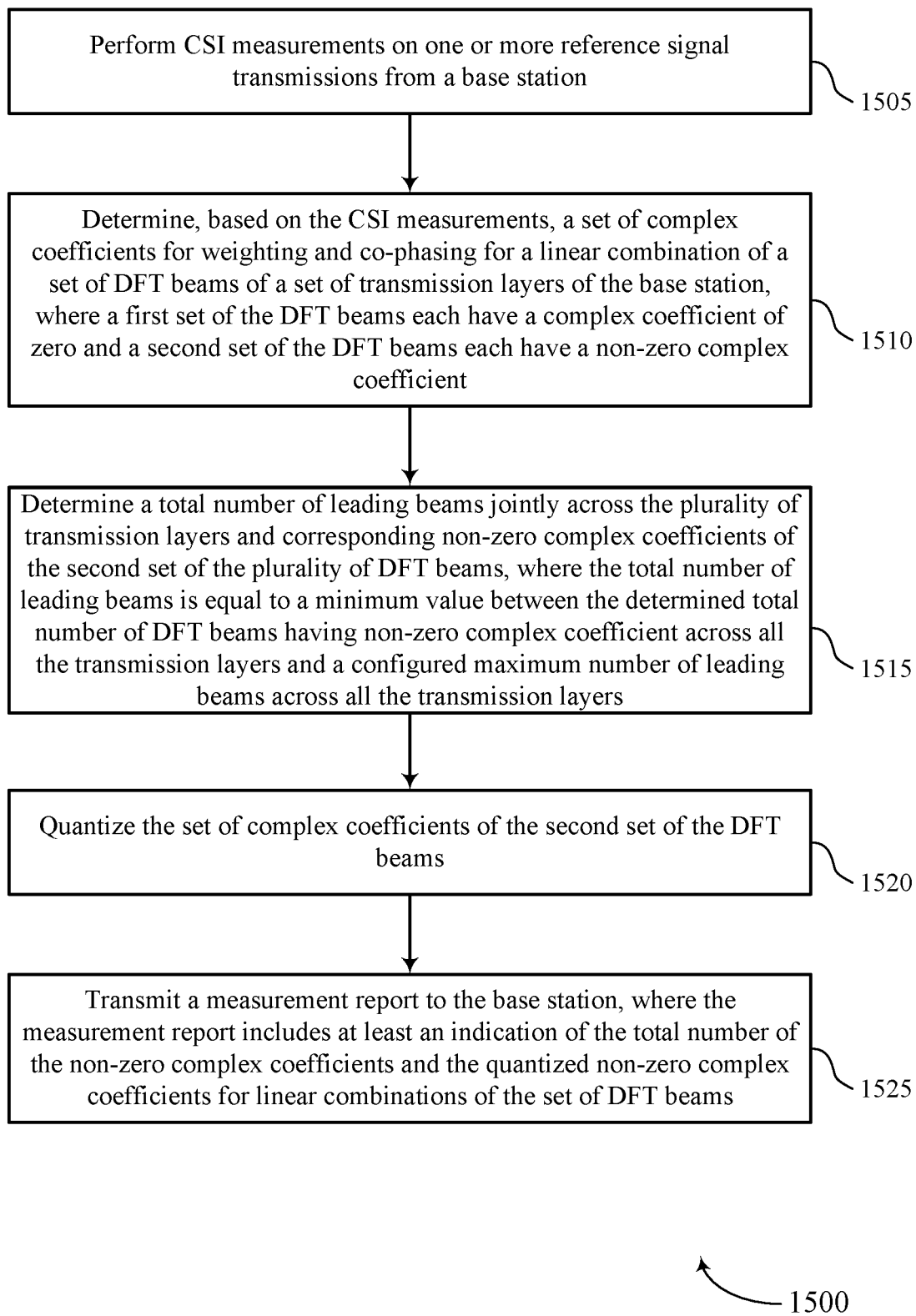
FIGS. 15 through 23 show flowcharts illustrating methods that support coefficient determination for measurement report feedback in multi-layer beamformed communications in accordance with aspects of the present disclosure.

FIG. 15 shows a flowchart illustrating a method 1500 that supports coefficient determination for measurement report feedback in multi-layer beamformed communications in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may perform CSI measurements on one or more reference signal transmissions from a base station. The operations of 1505 may be performed according to the methods described herein. In some examples, aspects of the operations of 1505 may be performed by a reference signal measurement component as described with reference to FIGS. 7 through 10.

At 1510, the UE may determine, based on the CSI measurements, a set of complex coefficients for weighting and co-phasing for a linear combination of a number of DFT beams of a set of transmission layers of the base station, where a first set of the DFT beams each have a complex coefficient of zero and a second set of the DFT beams each have a non-zero complex coefficient. The operations of 1510 may be performed according to the methods described herein. In some examples, aspects of the operations of 1510 may be performed by a coefficient manager as described with reference to FIGS. 7 through 10.

At 1515, the UE may determine a total number of leading beams jointly across the plurality of transmission layers and corresponding non-zero complex coefficients of the second set of the plurality of DFT beams, where the total number of leading beams is equal to a minimum value between the determined total number of DFT beams having non-zero complex coefficient across all the transmission layers and a configured maximum number of leading beams across all the transmission layers. The operations of 1515 may be performed according to the methods described herein. In some examples, aspects of the operations of 1515 may be performed by a leading beam manager as described with reference to FIGS. 7 through 10.

At 1520, the UE may quantize the set of complex coefficients of the second set of the DFT beams. The operations of 1520 may be performed according to the methods described herein. In some examples, aspects of the operations of 1520 may be performed by a quantization component as described with reference to FIGS. 7 through 10. In some cases, complex coefficients associated with the leading beams may be quantized with high-resolution quantization, and complex coefficients of non-leading beams may be quantized with low-resolution quantization.

At 1525, the UE may transmit a measurement report to the base station, where the measurement report includes at least an indication of the total number of the non-zero complex coefficients and the quantized non-zero complex coefficients for linear combinations of the set of DFT beams. The operations of 1525 may be performed according to the methods described herein. In some examples, aspects of the operations of 1525 may be performed by a measurement report manager as described with reference to FIGS. 7 through 10.

Figure 16:
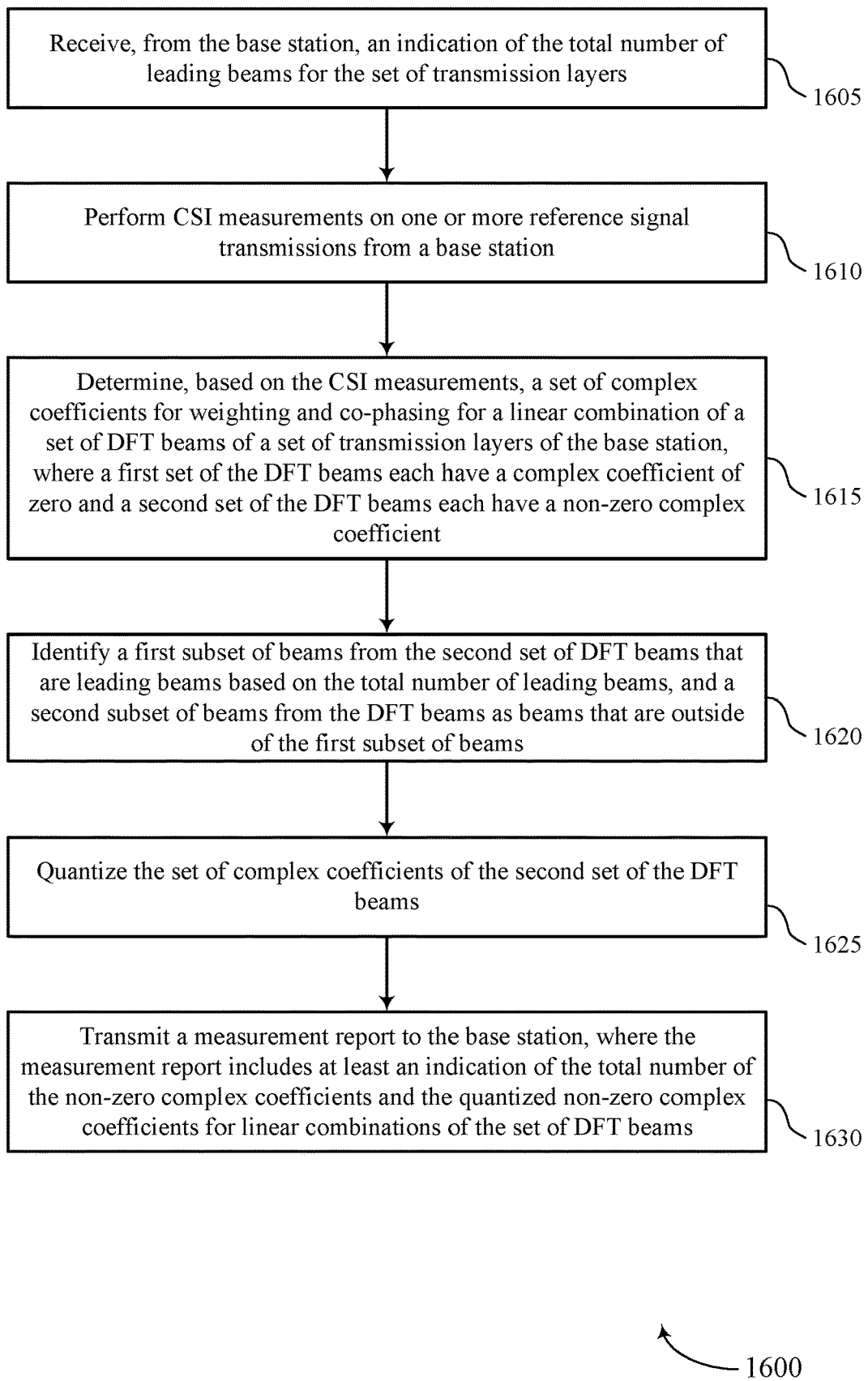

FIG. 16 shows a flowchart illustrating a method 1600 that supports coefficient determination for measurement report feedback in multi-layer beamformed communications in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from the base station, an indication of the total number of leading beams for the set of transmission layers. The operations of 1605 may be performed according to the methods described herein. In some examples, aspects of the operations of 1605 may be performed by a leading beam manager as described with reference to FIGS. 7 through 10.

At 1610, the UE may perform CSI measurements on one or more reference signal transmissions from a base station. The operations of 1610 may be performed according to the methods described herein. In some examples, aspects of the operations of 1610 may be performed by a reference signal measurement component as described with reference to FIGS. 7 through 10.

At 1615, the UE may determine, based on the CSI measurements, a set of complex coefficients for weighting and co-phasing for a linear combination of a set of DFT beams of a set of transmission layers of the base station, where a first set of the DFT beams each have a complex coefficient of zero and a second set of the DFT beams each have a non-zero complex coefficient. The operations of 1615 may be performed according to the methods described herein. In some examples, aspects of the operations of 1615 may be performed by a coefficient manager as described with reference to FIGS. 7 through 10.

At 1620, the UE may identify a first subset of beams from the second set of DFT beams that are leading beams based on the total number of leading beams, and a second subset of beams from the DFT beams as beams that are outside of the first subset of beams. The operations of 1620 may be performed according to the methods described herein. In some examples, aspects of the operations of 1620 may be performed by a leading beam manager as described with reference to FIGS. 7 through 10.

At 1625, the UE may quantize the set of complex coefficients of the second set of the DFT beams. The operations of 1625 may be performed according to the methods described herein. In some examples, aspects of the operations of 1625 may be performed by a quantization component as described with reference to FIGS. 7 through 10. In some cases, complex coefficients associated with the leading beams may be quantized with high-resolution quantization, and complex coefficients of non-leading beams may be quantized with low-resolution quantization.

At 1630, the UE may transmit a measurement report to the base station, where the measurement report includes at least an indication of the total number of the non-zero complex coefficients and the quantized non-zero complex coefficients for linear combinations of the set of DFT beams. The operations of 1630 may be performed according to the methods described herein. In some examples, aspects of the operations of 1630 may be performed by a measurement report manager as described with reference to FIGS. 7 through 10.

Figure 17:
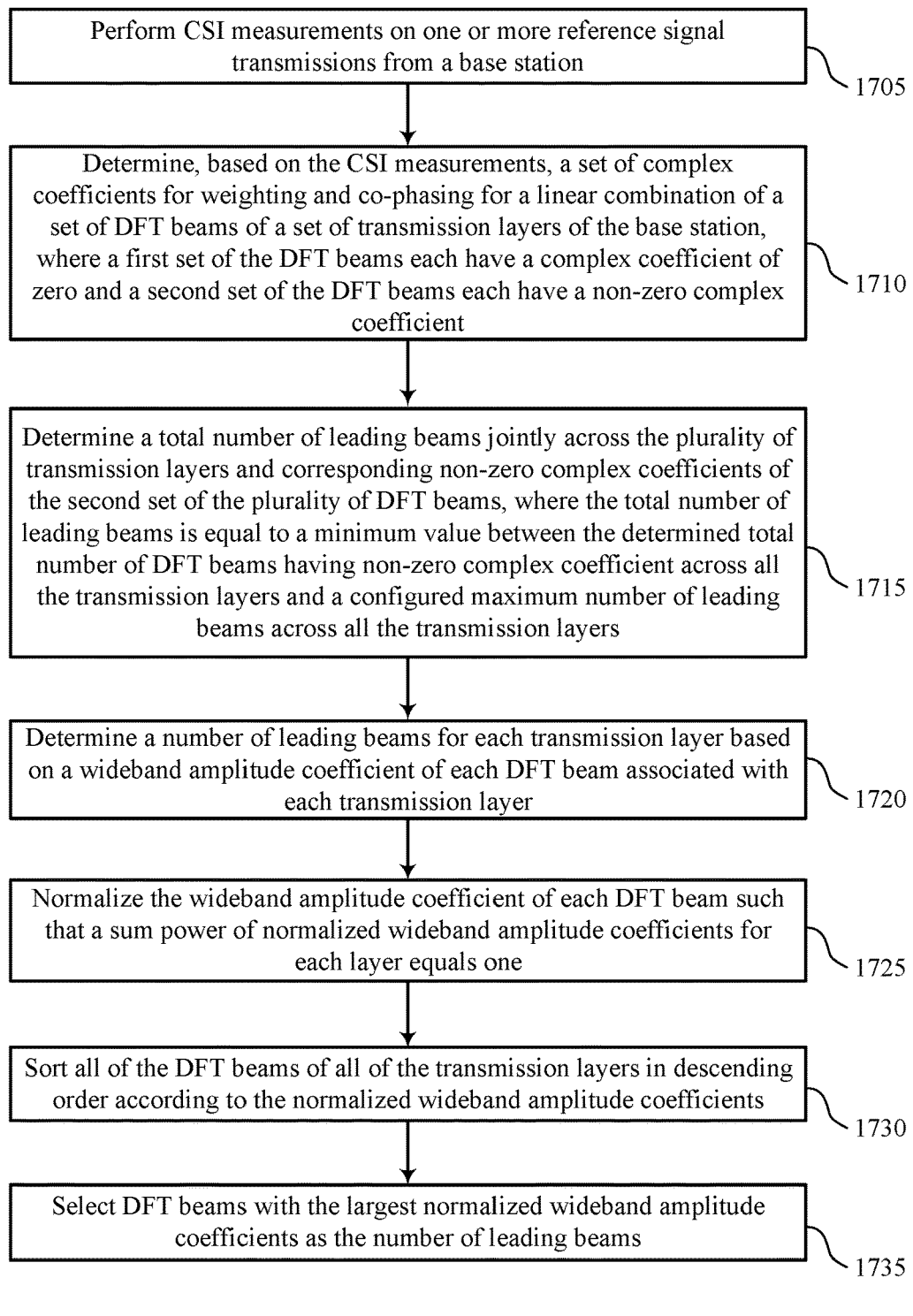

FIG. 17 shows a flowchart illustrating a method 1700 that supports coefficient determination for measurement report feedback in multi-layer beamformed communications in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may perform CSI measurements on one or more reference signal transmissions from a base station. The operations of 1705 may be performed according to the methods described herein. In some examples, aspects of the operations of 1705 may be performed by a reference signal measurement component as described with reference to FIGS. 7 through 10.

At 1710, the UE may determine, based on the CSI measurements, a set of complex coefficients for weighting and co-phasing for a linear combination of a set of DFT beams of a set of transmission layers of the base station, where a first set of the DFT beams each have a complex coefficient of zero and a second set of the DFT beams each have a non-zero complex coefficient. The operations of 1710 may be performed according to the methods described herein. In some examples, aspects of the operations of 1710 may be performed by a coefficient manager as described with reference to FIGS. 7 through 10.

At 1715, the UE may determine a total number of leading beams jointly across the plurality of transmission layers and corresponding non-zero complex coefficients of the second set of the plurality of DFT beams, where the total number of leading beams is equal to a minimum value between the determined total number of DFT beams having non-zero complex coefficient across all the transmission layers and a configured maximum number of leading beams across all the transmission layers. The operations of 1715 may be performed according to the methods described herein. In some examples, aspects of the operations of 1715 may be performed by a leading beam manager as described with reference to FIGS. 7 through 10.

At 1720, the UE may determine a number of leading beams for each transmission layer based on a wideband amplitude coefficient of each DFT beam associated with each transmission layer. The operations of 1720 may be performed according to the methods described herein. In some examples, aspects of the operations of 1720 may be performed by a leading beam manager as described with reference to FIGS. 7 through 10.

At 1725, the UE may normalize the wideband amplitude coefficient of each DFT beam such that a sum power of normalized wideband amplitude coefficients for each layer equals one. The operations of 1725 may be performed according to the methods described herein. In some examples, aspects of the operations of 1725 may be performed by a beam ordering component as described with reference to FIGS. 7 through 10.

At 1730, the UE may sort all of the DFT beams of all of the transmission layers in descending order according to the normalized wideband amplitude coefficients. The operations of 1730 may be performed according to the methods described herein. In some examples, aspects of the operations of 1730 may be performed by a beam ordering component as described with reference to FIGS. 7 through 10.

At 1735, the UE may select DFT beams with the largest normalized wideband amplitude coefficients as the number of leading beams. The operations of 1735 may be performed according to the methods described herein. In some examples, aspects of the operations of 1735 may be performed by a beam ordering component as described with reference to FIGS. 7 through 10.

Figure 18:
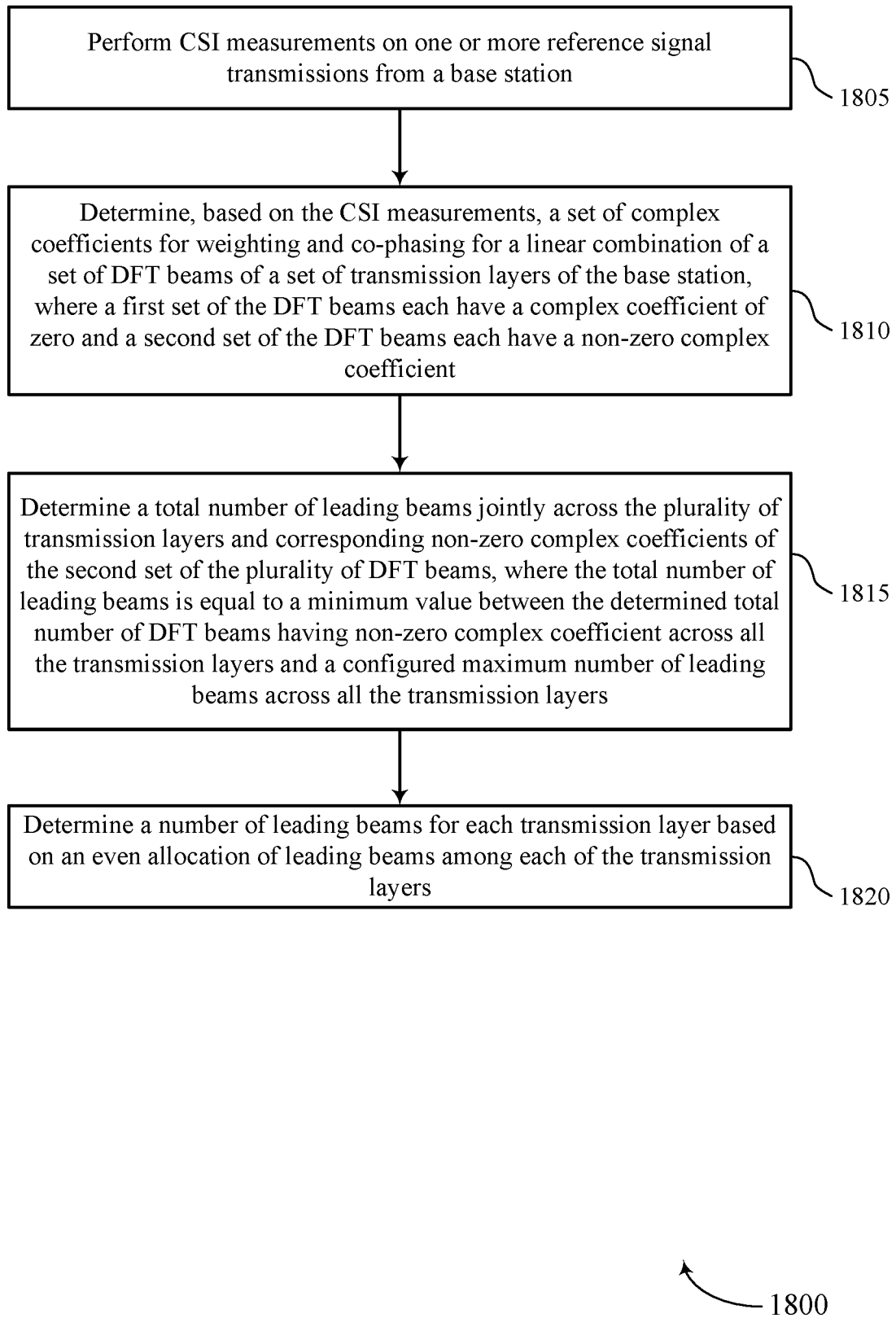

FIG. 18 shows a flowchart illustrating a method 1800 that supports coefficient determination for measurement report feedback in multi-layer beamformed communications in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may perform CSI measurements on one or more reference signal transmissions from a base station. The operations of 1805 may be performed according to the methods described herein. In some examples, aspects of the operations of 1805 may be performed by a reference signal measurement component as described with reference to FIGS. 7 through 10.

At 1810, the UE may determine, based on the CSI measurements, a set of complex coefficients for weighting and co-phasing for a linear combination of a set of DFT beams of a set of transmission layers of the base station, where a first set of the DFT beams each have a complex coefficient of zero and a second set of the DFT beams each have a non-zero complex coefficient. The operations of 1810 may be performed according to the methods described herein. In some examples, aspects of the operations of 1810 may be performed by a coefficient manager as described with reference to FIGS. 7 through 10.

At 1815, the UE may determine a total number of leading beams jointly across the plurality of transmission layers and corresponding non-zero complex coefficients of the second set of the plurality of DFT beams, where the total number of leading beams is equal to a minimum value between the determined total number of DFT beams having non-zero complex coefficient across all the transmission layers and a configured maximum number of leading beams across all the transmission layers. The operations of 1815 may be performed according to the methods described herein. In some examples, aspects of the operations of 1815 may be performed by a leading beam manager as described with reference to FIGS. 7 through 10.

At 1820, the UE may determine a number of leading beams for each transmission layer based on an even allocation of leading beams among each of the transmission layers. The operations of 1820 may be performed according to the methods described herein. In some examples, aspects of the operations of 1820 may be performed by a leading beam manager as described with reference to FIGS. 7 through 10.

Figure 19:
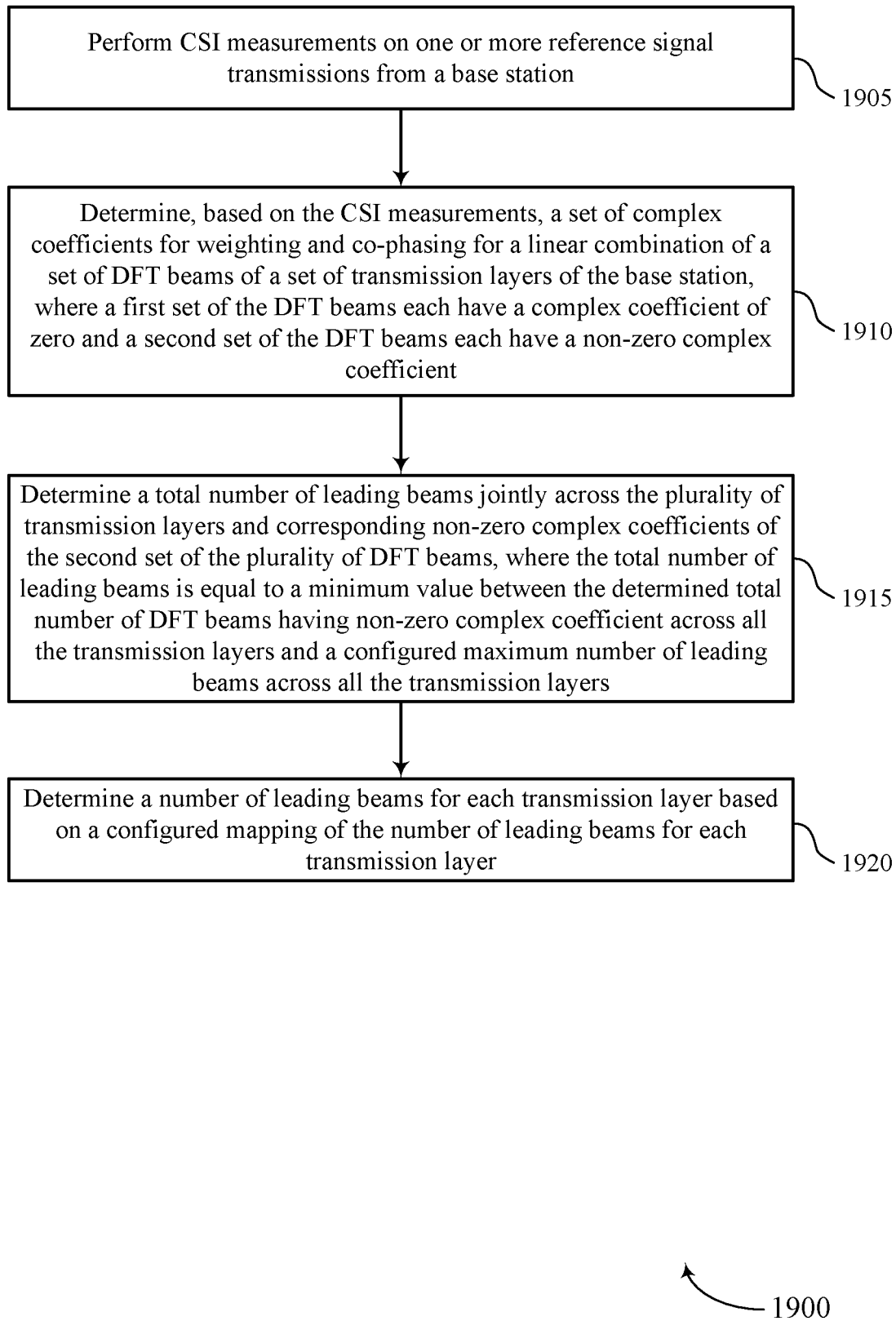

FIG. 19 shows a flowchart illustrating a method 1900 that supports coefficient determination for measurement report feedback in multi-layer beamformed communications in accordance with aspects of the present disclosure. The operations of method 1900 may be implemented by a UE 115 or its components as described herein. For example, the operations of method 1900 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1905, the UE may perform CSI measurements on one or more reference signal transmissions from a base station. The operations of 1905 may be performed according to the methods described herein. In some examples, aspects of the operations of 1905 may be performed by a reference signal measurement component as described with reference to FIGS. 7 through 10.

At 1910, the UE may determine, based on the CSI measurements, a set of complex coefficients for weighting and co-phasing for a linear combination of a set of DFT beams of a set of transmission layers of the base station, where a first set of the DFT beams each have a complex coefficient of zero and a second set of the DFT beams each have a non-zero complex coefficient. The operations of 1910 may be performed according to the methods described herein. In some examples, aspects of the operations of 1910 may be performed by a coefficient manager as described with reference to FIGS. 7 through 10.

At 1915, the UE may determine a total number of leading beams jointly across the plurality of transmission layers and corresponding non-zero complex coefficients of the second set of the plurality of DFT beams, where the total number of leading beams is equal to a minimum value between the determined total number of DFT beams having non-zero complex coefficient across all the transmission layers and a configured maximum number of leading beams across all the transmission layers. The operations of 1915 may be performed according to the methods described herein. In some examples, aspects of the operations of 1915 may be performed by a leading beam manager as described with reference to FIGS. 7 through 10.

At 1920, the UE may determine a number of leading beams for each transmission layer based on a configured mapping of the number of leading beams for each transmission layer. The operations of 1920 may be performed according to the methods described herein. In some examples, aspects of the operations of 1920 may be performed by a leading beam manager as described with reference to FIGS. 7 through 10.

Figure 20:
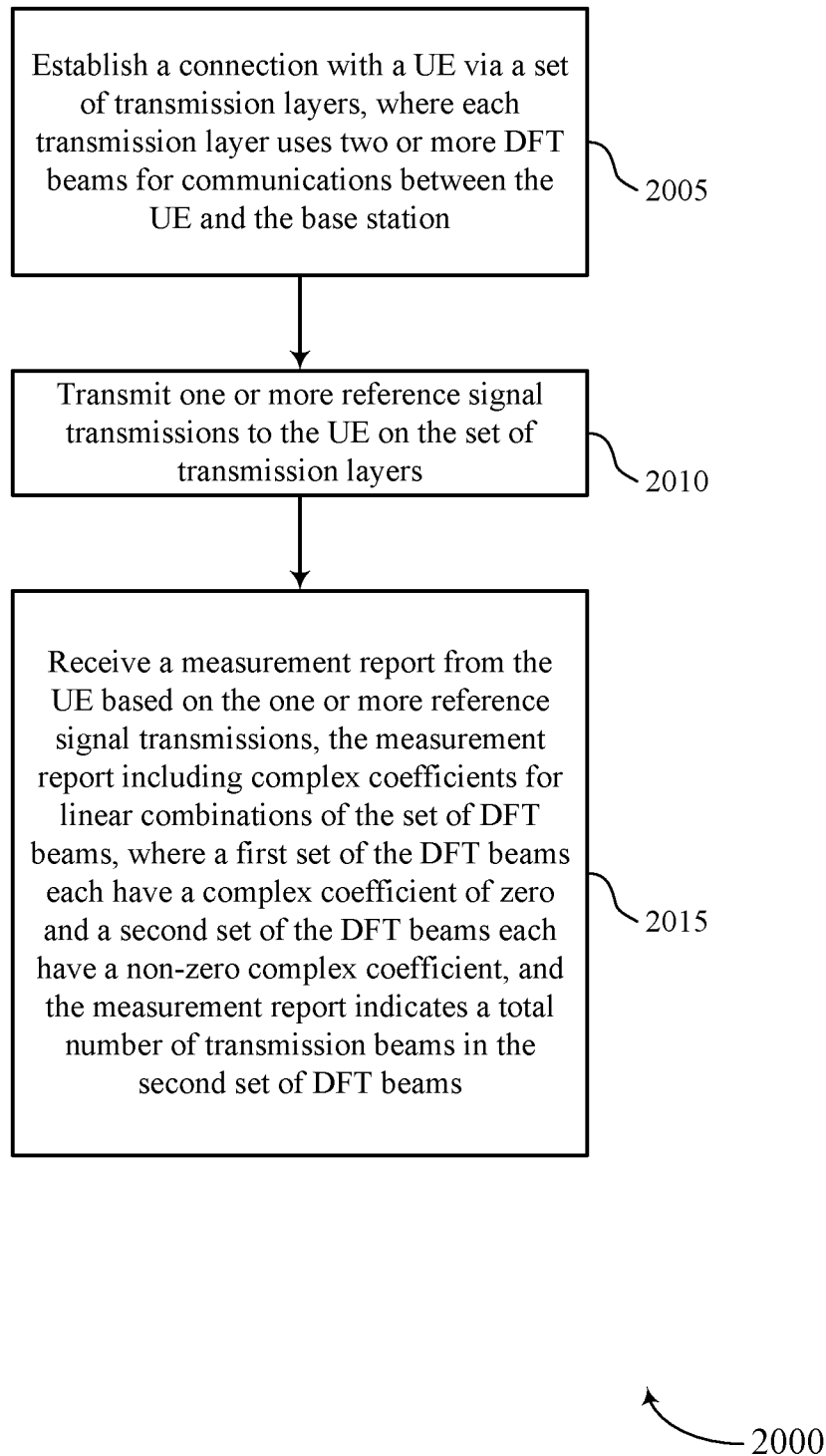

FIG. 20 shows a flowchart illustrating a method 2000 that supports coefficient determination for measurement report feedback in multi-layer beamformed communications in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may establish a connection with a UE via a set of transmission layers, where each transmission layer uses two or more DFT beams for communications between the UE and the base station. The operations of 2005 may be performed according to the methods described herein. In some examples, aspects of the operations of 2005 may be performed by a DFT beam manager as described with reference to FIGS. 11 through 14.

At 2010, the base station may transmit one or more reference signal transmissions to the UE on the set of transmission layers. The operations of 2010 may be performed according to the methods described herein. In some examples, aspects of the operations of 2010 may be performed by a reference signal component as described with reference to FIGS. 11 through 14.

At 2015, the base station may receive a measurement report from the UE based on the one or more reference signal transmissions, the measurement report including complex coefficients for linear combinations of the set of DFT beams, where a first set of the DFT beams each have a complex coefficient of zero and a second set of the DFT beams each have a non-zero complex coefficient, and the measurement report indicates a total number of transmission beams in the second set of DFT beams. The operations of 2015 may be performed according to the methods described herein. In some examples, aspects of the operations of 2015 may be performed by a measurement report manager as described with reference to FIGS. 11 through 14.

Figure 21:
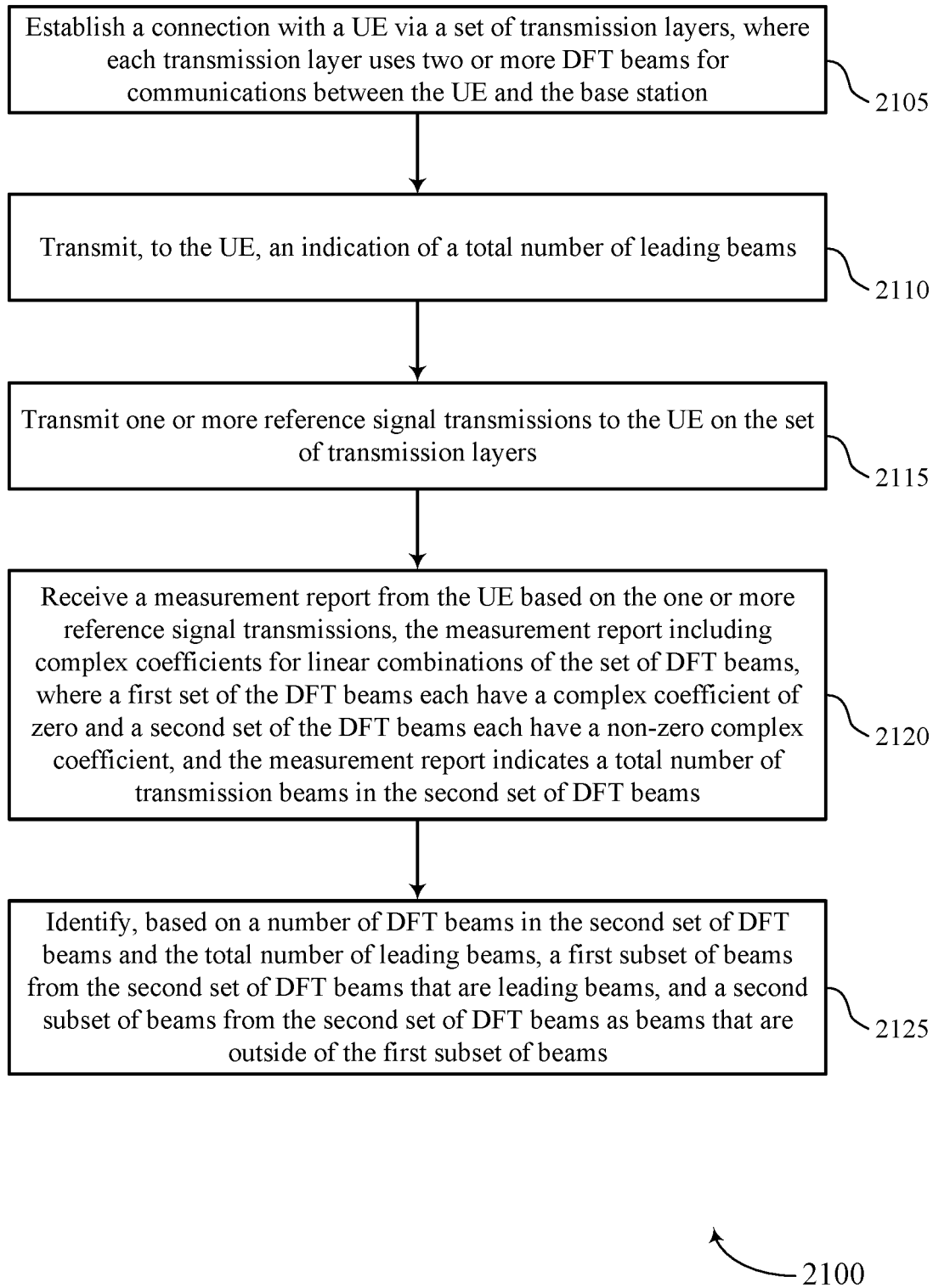

FIG. 21 shows a flowchart illustrating a method 2100 that supports coefficient determination for measurement report feedback in multi-layer beamformed communications in accordance with aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the base station may establish a connection with a UE via a set of transmission layers, where each transmission layer uses two or more DFT beams for communications between the UE and the base station. The operations of 2105 may be performed according to the methods described herein. In some examples, aspects of the operations of 2105 may be performed by a DFT beam manager as described with reference to FIGS. 11 through 14.

At 2110, the base station may transmit, to the UE, an indication of a total number of leading beams. The operations of 2110 may be performed according to the methods described herein. In some examples, aspects of the operations of 2110 may be performed by a leading beam manager as described with reference to FIGS. 11 through 14.

At 2115, the base station may transmit one or more reference signal transmissions to the UE on the set of transmission layers. The operations of 2115 may be performed according to the methods described herein. In some examples, aspects of the operations of 2115 may be performed by a reference signal component as described with reference to FIGS. 11 through 14.

At 2120, the base station may receive a measurement report from the UE based on the one or more reference signal transmissions, the measurement report including complex coefficients for linear combinations of the set of DFT beams, where a first set of the DFT beams each have a complex coefficient of zero and a second set of the DFT beams each have a non-zero complex coefficient, and the measurement report indicates a total number of transmission beams in the second set of DFT beams. The operations of 2120 may be performed according to the methods described herein. In some examples, aspects of the operations of 2120 may be performed by a measurement report manager as described with reference to FIGS. 11 through 14.

At 2125, the base station may identify, based on a number of DFT beams in the second set of DFT beams and the total number of leading beams, a first subset of beams from the second set of DFT beams that are leading beams, and a second subset of beams from the second set of DFT beams as beams that are outside of the first subset of beams. The operations of 2125 may be performed according to the methods described herein. In some examples, aspects of the operations of 2125 may be performed by a leading beam manager as described with reference to FIGS. 11 through 14.

Figure 22:
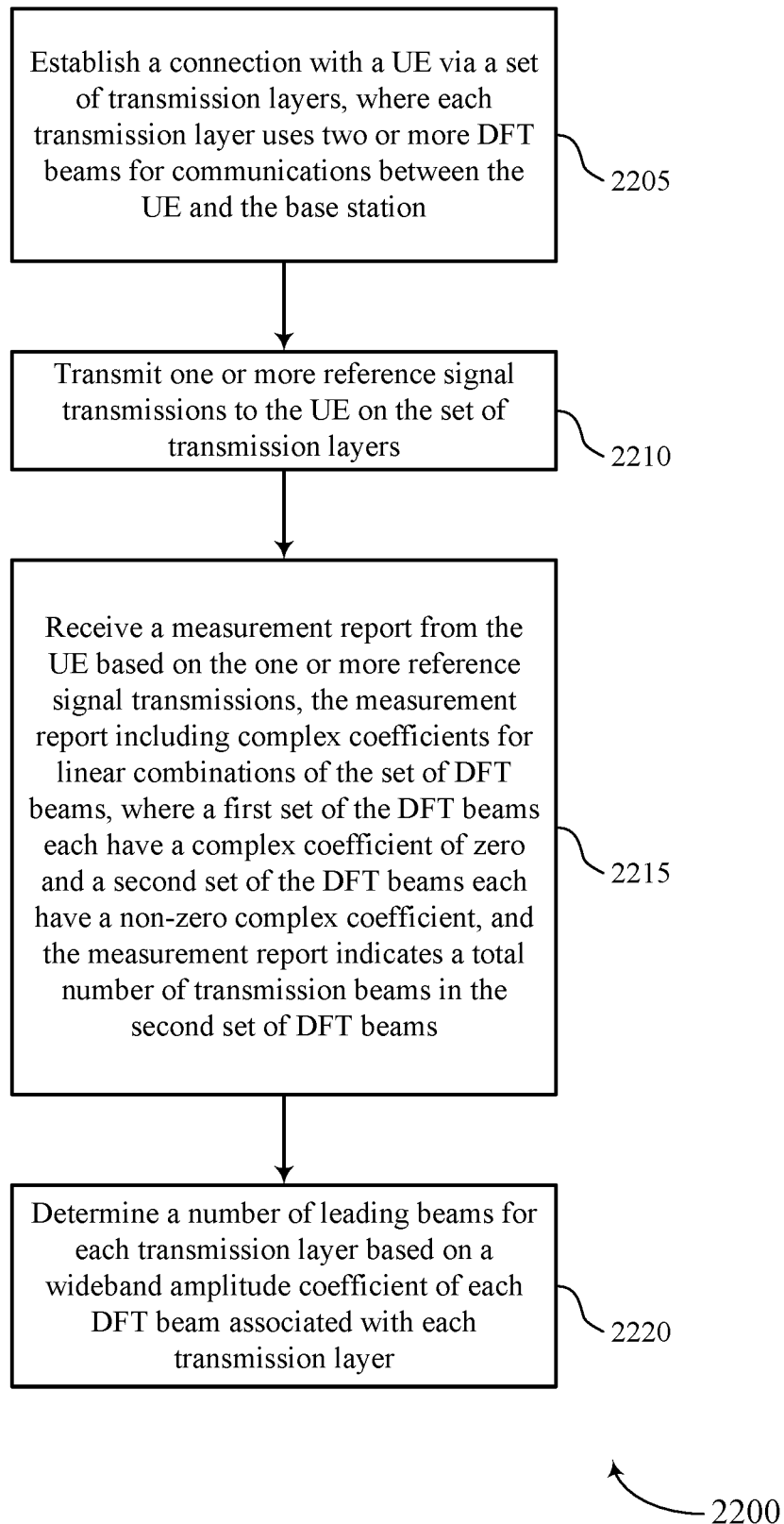

FIG. 22 shows a flowchart illustrating a method 2200 that supports coefficient determination for measurement report feedback in multi-layer beamformed communications in accordance with aspects of the present disclosure. The operations of method 2200 may be implemented by a base station 105 or its components as described herein. For example, the operations of method 2200 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2205, the base station may establish a connection with a UE via a set of transmission layers, where each transmission layer uses two or more DFT beams for communications between the UE and the base station. The operations of 2205 may be performed according to the methods described herein. In some examples, aspects of the operations of 2205 may be performed by a DFT beam manager as described with reference to FIGS. 11 through 14.

At 2210, the base station may transmit one or more reference signal transmissions to the UE on the set of transmission layers. The operations of 2210 may be performed according to the methods described herein. In some examples, aspects of the operations of 2210 may be performed by a reference signal component as described with reference to FIGS. 11 through 14.

At 2215, the base station may receive a measurement report from the UE based on the one or more reference signal transmissions, the measurement report including complex coefficients for linear combinations of the set of DFT beams, where a first set of the DFT beams each have a complex coefficient of zero and a second set of the DFT beams each have a non-zero complex coefficient, and the measurement report indicates a total number of transmission beams in the second set of DFT beams. The operations of 2215 may be performed according to the methods described herein. In some examples, aspects of the operations of 2215 may be performed by a measurement report manager as described with reference to FIGS. 11 through 14.

At 2220, the base station may determine a number of leading beams for each transmission layer based on a wideband amplitude coefficient of each DFT beam associated with each transmission layer. The operations of 2220 may be performed according to the methods described herein. In some examples, aspects of the operations of 2220 may be performed by a leading beam manager as described with reference to FIGS. 11 through 14.

Figure 23:
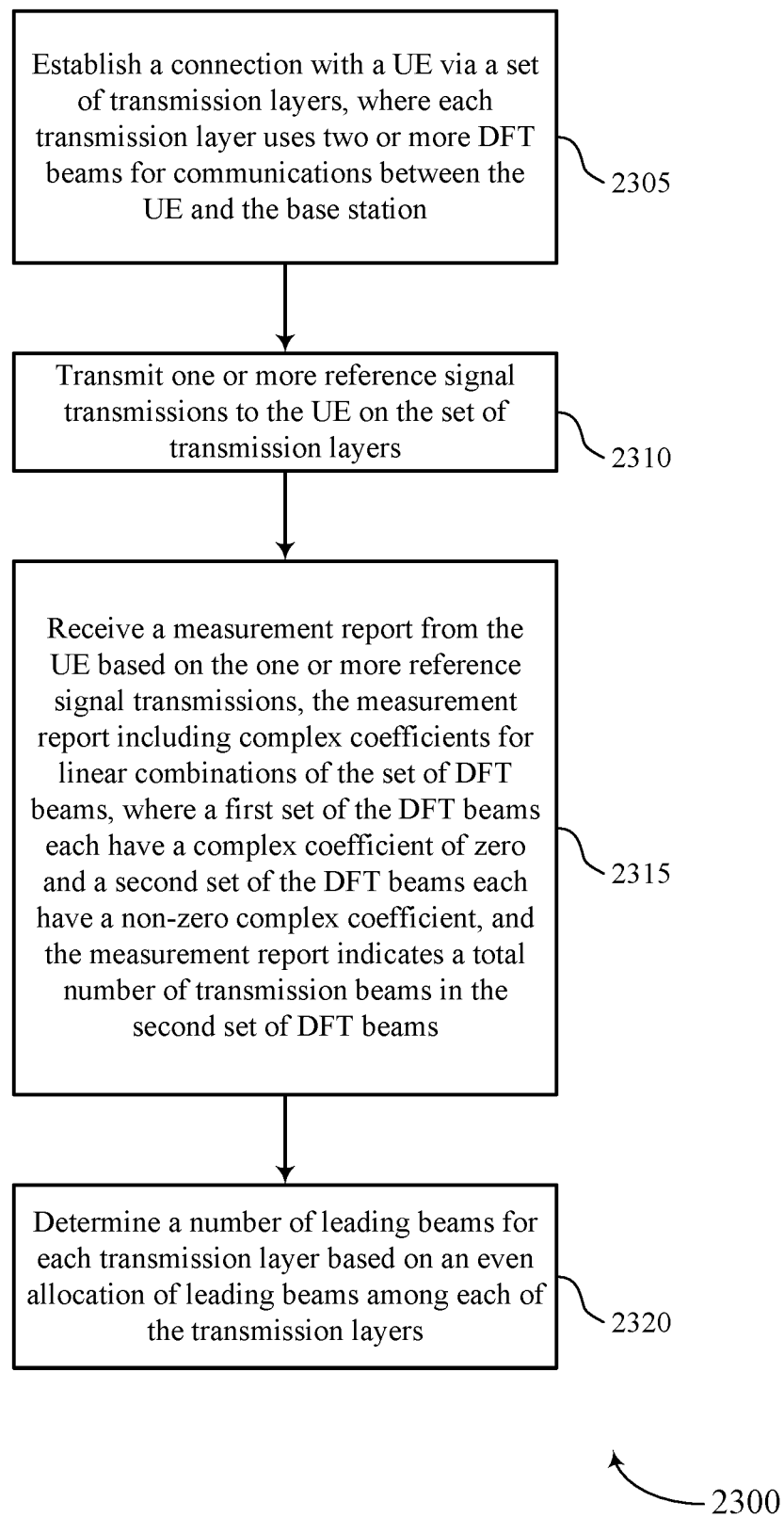

FIG. 23 shows a flowchart illustrating a method 2300 that supports coefficient determination for measurement report feedback in multi-layer beamformed communications in accordance with aspects of the present disclosure. The operations of method 2300 may be implemented by a base station 105 or its components as described herein. For example, the operations of method 2300 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2305, the base station may establish a connection with a UE via a set of transmission layers, where each transmission layer uses two or more DFT beams for communications between the UE and the base station. The operations of 2305 may be performed according to the methods described herein. In some examples, aspects of the operations of 2305 may be performed by a DFT beam manager as described with reference to FIGS. 11 through 14.

At 2310, the base station may transmit one or more reference signal transmissions to the UE on the set of transmission layers. The operations of 2310 may be performed according to the methods described herein. In some examples, aspects of the operations of 2310 may be performed by a reference signal component as described with reference to FIGS. 11 through 14.

At 2315, the base station may receive a measurement report from the UE based on the one or more reference signal transmissions, the measurement report including complex coefficients for linear combinations of the set of DFT beams, where a first set of the DFT beams each have a complex coefficient of zero and a second set of the DFT beams each have a non-zero complex coefficient, and the measurement report indicates a total number of transmission beams in the second set of DFT beams. The operations of 2315 may be performed according to the methods described herein. In some examples, aspects of the operations of 2315 may be performed by a measurement report manager as described with reference to FIGS. 11 through 14.

At 2320, the base station may determine a number of leading beams for each transmission layer based on an even allocation of leading beams among each of the transmission layers. The operations of 2320 may be performed according to the methods described herein. In some examples, aspects of the operations of 2320 may be performed by a leading beam manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
   at least one processor; and
   memory coupled to the at least one processor, wherein the at least one processor is configured to:
     determine a set of beams across a plurality of layers having non-zero complex coefficients, wherein a quantity of beams included in the set of beams corresponds to an amount of beams of a plurality of beams that have non-zero complex coefficients and is less than or equal to a maximum quantity of beams having non-zero complex coefficients across the plurality of layers;
     quantize the non-zero complex coefficients of the set of beams based at least in part on the quantity of beams to generate quantized non-zero complex coefficients; and
     transmit a measurement report, wherein the measurement report includes at least an indication of the quantity of beams having non-zero complex coefficients and the quantized non-zero complex coefficients, wherein each respective non-zero complex coefficient is for weighting and co-phasing for a linear combination of the plurality of beams.

2. The apparatus of claim 1, wherein to determine the set of beams, the at least one processor is configured to:
   receive an indication of the maximum quantity of beams having non-zero complex coefficients across the plurality of layers; and
   determine the set of beams as a subset of the plurality of beams that have non-zero complex coefficients, based at least in part on a quantity of beams that have non-zero complex coefficients and the maximum quantity of beams having non-zero complex coefficients.

3. The apparatus of claim 2, wherein a high-resolution quantized coefficient corresponds to at least a first beam of the set of beams, and wherein a respective low-resolution quantized coefficient corresponds to one or more beams other than the first beam that are not included in the set of beams.

4. The apparatus of claim 1, wherein the at least one processor is configured to:
   determine, based at least in part on channel state information (CSI) measurements of one or more reference signal transmissions, a plurality of complex coefficients, wherein a respective complex coefficient of zero of the plurality of complex coefficients corresponds to each respective beam of a first subset of the plurality of beams that are not included in the set of beams, and a respective non-zero complex coefficient of the plurality of complex coefficients corresponds to each respective beam of the set of beams.

5. The apparatus of claim 1, wherein to transmit the measurement report, the at least one processor is configured to:
   transmit a first report that includes the indication of the quantity of beams having non-zero complex coefficients across the plurality of layers; and
   transmit a second report that indicates the quantized non-zero complex coefficients.

6. The apparatus of claim 5, wherein the first report and the second report are separately encoded.

7. The apparatus of claim 5, wherein the first report further includes one or more of a rank indicator (RI) or a channel quality indicator (CQI).

8. The apparatus of claim 7, wherein each of the indication of the quantity of beams having non-zero complex coefficients across the plurality of layers, and one or more of the RI or the CQI, are separately encoded in the first report.

9. The apparatus of claim 5, wherein the first report provides part 1 of a Type II CSI feedback, and the second report provides part 2 of the Type II CSI feedback.

10. The apparatus of claim 1, wherein the at least one processor is configured to:
    perform channel state information (CSI) measurements on one or more reference signal transmissions, and wherein the non-zero complex coefficients are based at least in part on the CSI measurements.

11. The apparatus of claim 1, wherein the plurality of beams include a plurality of discrete Fourier transform (DFT) beams for a plurality of transmission layers.

12. A network device for wireless communication, comprising:
    at least one processor; and
    memory coupled to the at least one processor, wherein the at least one processor is configured to:
      establish a connection with an apparatus via a plurality of layers, wherein a respective two or more beams correspond to each respective layer of the plurality of layers for communication between the apparatus and the network device, wherein a plurality of beams includes each respective two or more beams; and
      receive a measurement report from the apparatus, wherein the measurement report indicates a quantity of beams of the plurality of beams across the plurality of layers that have non-zero complex coefficients for precoding communications via each respective two or more beams, and wherein the measurement report indicates quantized non-zero complex coefficients for linear combinations of the quantity of beams.

13. The network device of claim 12, wherein the at least one processor is configured to:
    transmit an indication of a maximum quantity of beams having non-zero complex coefficients across the plurality of layers, and wherein the quantity of beams indicated in the measurement report is based on the maximum quantity of beams.

14. The network device of claim 13, wherein a high-resolution quantized coefficient corresponds to at least a first beam of the plurality of beams, and wherein a respective low-resolution quantized coefficient corresponds to one or more beams other than the first beam.

15. The network device of claim 12, wherein to receive the measurement report, the at least one processor is configured to:
receive a first report that includes the indication of the quantity of beams; and
receive a second report that indicates the quantized non-zero complex coefficients.

16. The network device of claim 15, wherein the first report and the second report are separately encoded.

17. The network device of claim 15, wherein the first report further includes one or more of a rank indicator (RI) or a channel quality indicator (CQI).

18. The network device of claim 17, wherein each of the indication of the quantity of beams, and one or more of the RI or the CQI, are separately encoded in the first report.

19. The network device of claim 15, wherein the first report provides part 1 of a Type II CSI feedback, and the second report provides part 2 of the Type II CSI feedback.

20. A method of wireless communication performed by an apparatus, comprising:
determining a set of beams across a plurality of layers having non-zero complex coefficients, wherein a quantity of beams included in the set of beams corresponds to an amount of beams of a plurality of beams that have non-zero complex coefficients and is less than or equal to a maximum quantity of beams having non-zero complex coefficients across the plurality of layers;
quantizing the non-zero complex coefficients of the set of beams based at least in part on the quantity of beams to generate quantized non-zero complex coefficients; and
transmitting a measurement report, wherein the measurement report includes at least an indication of the quantity of beams having non-zero complex coefficients and the quantized non-zero complex coefficients, wherein each respective non-zero complex coefficient is for weighting and co-phasing for a linear combination of the plurality of beams.

21. The method of claim 20, further comprising:
receiving an indication of the maximum quantity of beams having non-zero complex coefficients across the plurality of layers; and
determining the set of beams as a subset of the plurality of beams that have non-zero complex coefficients, based at least in part on a quantity of beams that have non-zero complex coefficients and the maximum quantity of beams having non-zero complex coefficients.

22. The method of claim 21, wherein a high-resolution quantized coefficient corresponds to at least a first beam of the set of beams, and wherein a respective low-resolution quantized coefficient corresponds to one or more beams other than the first beam that are not included in the set of beams.

23. The method of claim 20, further comprising:
determining, based at least in part on channel state information (CSI) measurements of one or more reference signal transmissions, a plurality of complex coefficients, wherein a respective complex coefficient of zero of the plurality of complex coefficients corresponds to each respective beam of a first subset of the plurality of beams that are not included in the set of beams, and a respective non-zero complex coefficient of the plurality of complex coefficients corresponds to each respective beam of the set of beams.

24. The method of claim 20, wherein the transmitting the measurement report comprises:
transmitting a first report that includes the indication of the quantity of beams having non-zero complex coefficients across the plurality of layers; and
transmitting a second report that indicates the quantized non-zero complex coefficients.

25. The method of claim 24, wherein the first report and the second report are separately encoded.

26. The method of claim 24, wherein the first report further includes one or more of a rank indicator (RI) or a channel quality indicator (CQI).

27. The method of claim 26, wherein each of the indication of the quantity of beams having non-zero complex coefficients across the plurality of layers, and one or more of the RI or the CQI, are separately encoded in the first report.

28. The method of claim 24, wherein the first report provides part 1 of a Type II CSI feedback, and the second report provides part 2 of the Type II CSI feedback.

29. A method of wireless communication performed by a network device, comprising:
establishing a connection with an apparatus via a plurality of layers, wherein a respective two or more beams correspond to each respective layer of the plurality of layers for communication between the apparatus and the network device, wherein a plurality of beams includes each respective two or more beams; and
receiving a measurement report from the apparatus, wherein the measurement report indicates a quantity of beams of the plurality of beams across the plurality of layers that have non-zero complex coefficients for precoding communications via each respective two or more beams, and wherein the measurement report indicates quantized non-zero complex coefficients for linear combinations of the quantity of beams.

30. The method of claim 29, further comprising:
transmitting an indication of a maximum quantity of beams having non-zero complex coefficients across the plurality of layers, and wherein the quantity of beams indicated in the measurement report is based on the maximum quantity of beams.

31. The method of claim 30, wherein a high-resolution quantized coefficient corresponds to at least a first beam of the plurality of beams, and wherein a respective low-resolution quantized coefficient corresponds to one or more beams other than the first beam.

32. The method of claim 29, wherein the receiving the measurement report comprises:
receiving a first report that includes the indication of the quantity of beams; and
receiving a second report that indicates the quantized non-zero complex coefficients.

33. The method of claim 32, wherein the first report and the second report are separately encoded.

34. The method of claim 32, wherein the first report further includes one or more of a rank indicator (RI) or a channel quality indicator (CQI).

35. The method of claim 34, wherein each of the indication of the quantity of beams, and one or more of the RI or the CQI, are separately encoded in the first report.

* * * * *